(12) United States Patent
Dowling

(10) Patent No.: US 7,107,536 B1
(45) Date of Patent: *Sep. 12, 2006

(54) REMOTE-AGENT-OBJECT BASED MULTILEVEL BROWSER

(76) Inventor: Eric Morgan Dowling, 5107 5th Ave., Holmes Beach, FL (US) 34217

( * ) Notice: Subject to any disclaimer, the term of this patent is extended or adjusted under 35 U.S.C. 154(b) by 348 days.

This patent is subject to a terminal disclaimer.

(21) Appl. No.: 09/702,455

(22) Filed: Oct. 31, 2000

Related U.S. Application Data

(63) Continuation-in-part of application No. 09/512,046, filed on Feb. 24, 2000.

(51) Int. Cl.
*G09G 5/00* (2006.01)

(52) U.S. Cl. .................. 715/738; 715/749; 715/809; 707/3

(58) Field of Classification Search ................ 345/854, 345/738, 727, 728, 733, 740, 744, 748, 749, 345/760, 968; 707/10, 3, 4, 5, 6; 709/202, 709/217, 218, 219; 715/738, 739, 740, 748, 715/749, 808, 809
See application file for complete search history.

(56) References Cited

U.S. PATENT DOCUMENTS

| | | | |
|---|---|---|---|
| 5,701,451 A | 12/1997 | Rogers et al. | |
| 5,793,964 A | 8/1998 | Rogers et al. | |
| 5,930,472 A | 7/1999 | Smith | |
| 5,974,441 A * | 10/1999 | Rogers et al. | 709/200 |
| 6,006,252 A | 12/1999 | Wolfe | |
| 6,125,395 A * | 9/2000 | Rosenberg et al. | 709/228 |
| 6,175,830 B1 | 1/2001 | Maynard | |
| 6,202,061 B1 | 3/2001 | Khosla et al. | |
| 6,278,993 B1 * | 8/2001 | Kumar et al. | 707/3 |
| 6,282,548 B1 | 8/2001 | Bruner et al. | |
| 6,282,549 B1 * | 8/2001 | Hoffert et al. | 707/104.1 |
| 6,295,526 B1 | 9/2001 | Kreiner et al. | |
| 6,304,864 B1 * | 10/2001 | Liddy et al. | 706/15 |
| 6,313,855 B1 | 11/2001 | Shuping et al. | |
| 6,324,552 B1 * | 11/2001 | Chang et al. | 715/501.1 |
| 6,334,145 B1 * | 12/2001 | Adams et al. | 709/217 |
| 6,338,059 B1 | 1/2002 | Fields et al. | |

(Continued)

OTHER PUBLICATIONS

"Mobile Agents and the Future of the Internet," ACM Operating Systems Review 33(3), Aug. 1999, by David Kotz et al.
"A Hands-On Look at Java Mobile Agents," IEEE Internet Computing, Jul.-Aug. 1997, by Joseph Kiniry et al.

(Continued)

*Primary Examiner*—Ba Huynh
(74) *Attorney, Agent, or Firm*—Eric M. Dowling

(57) ABSTRACT

A architecture is provided to enable a client web browser to conduct and manage a multilevel search. The browser includes an application layer interface. The application layer interface is for coupling to network via a protocol stack. The browser also includes a markup language parser. The parser receives information from the application layer interface. The browser includes a graphical user interface for presenting information to a user and allowing the user to specify a set of multilevel search parameters. The browser also includes a multilevel object factory coupled to receive a first input relating to a target web page and a second input specifying a multilevel browser operation such as a multilevel search. The multilevel object factory specifies a remote object agent that orchestrates a multilevel browser operation based upon the first and second inputs. The remote object agent is exported from the web browser to execute on a network server.

59 Claims, 9 Drawing Sheets

U.S. PATENT DOCUMENTS 6,381,637 B1    4/2002  Kamada
6,405,192 B1 *  6/2002  Brown et al. .................. 707/3
6,415,278 B1    7/2002  Sweet et al.
6,476,827 B1 *  11/2002  Porter ......................... 715/738
6,516,312 B1 *  2/2003  Kraft et al. .................... 707/3
6,631,496 B1 *  10/2003  Li et al. ................... 715/501.1
6,819,339 B1    11/2004  Dowling

OTHER PUBLICATIONS

"Agent Augmented Community-Information—The ACORN Architecture", http://ai.itt.nrc.ca/~steve/Pubs/ACORN/CASCON97/html/CASCON97.html.

"Mobile Agent Computing: A White Paper," http://www.meitca.com/HSL/Projects/Concordia/MobileAgents/WhitePaper.html.

* cited by examiner

REMOTE-AGENT-OBJECT BASED MULTILEVEL BROWSER

This application is a continuation in part (CIP) of copending U.S. patent application Ser. No. 09/512,046, entitled "Web browser with multilevel functions," filed Feb. 24, 2000, and assigned to art group unit 2755.

BACKGROUND OF THE INVENTION

1. Field of the Invention

This invention relates generally to network client and server devices and programs. More particularly, the invention relates to a web browser and server-side systems that provide automated multilevel-search-related functions.

2. Description of the Related Art

The Internet enables companies and individuals to post information using an interconnected set of web pages. A first web page is connected to a second web page using a hyperlink. The HTTP protocol is used to transfer data across the Internet from one machine to another so that when a user clicks on a hyperlink in a web page, the web page referenced by the hyperlink is accessed. The action of a user clicking on a sequence of links to move from one web page to another is known as "surfing the web" or "web browsing." Typically a client software system known as a "web browser" is used to this end. Search engines are provided to help a user find web pages related to a specific topic. Typically a search engine maintains a database of web pages and performs searches based on keywords found in the web pages. In most cases the search engine is implemented within a web server as opposed to a client device.

While web browsers are very useful, prior art web browsers are in many ways limited. For example, most browsers contain a search mechanism known as "find in page." In the Microsoft Internet Explorer, the "find in page" feature works by having a use activate the "edit" menu and then the "Find (on this page)" submenu. Alternatively the user may select CRTL+F in order to activate the "find in page" menu. When the user selects "find in page" a dialog box appears. A user is able to enter a word into this dialog box. If the word is in the markup file currently loaded into the web browser, the word will be highlighted to the user.

While the "find in page" feature found in prior art web browsers is useful it lacks desirable functionality. For example, a current web page loaded into a browser usually includes one or more hyperlinks. If the desired word is on a page pointed to by any of the hyperlinks of the currently loaded page, the "find in page" feature would turn up a negative result. This forces the user to select each hyperlink and then perform a separate "find in page" search on each page referenced by the current page. In some cases this can be most distressing to the user, for example when the current page contains very many hyperlinks or has a richly link-nested structure. In such cases the user is forced to spend undue time searching for the desired word. It would be desirable to have a browser or a browser plug-in that would facilitate word and concept searches through multilevel document structures. Such a browser would increase the productivity of network users. It would also be desirable to allow a user to print pages linked to a given base level document or perform other page-specific functions to a nested structure of linked pages without needing to manually access and specify operations for each page.

Another area where a more powerful web browser is needed is caused by poor server systems. For example, when visiting a certain company's web site user may be presented with a search engine specific to that web site. In some cases these search engines produce a lot of results that are irrelevant. In many cases the keywords requested in the search do not even appear in the returned web pages. For example a user may run a search and receive 450 results, but only three of these are of interest. To process such an output, the user must spend undue time hunting for the three documents of interest among the 450 results. For example these 450 results are displayed 20 per results page. The user then views each results page, clicks on each link that may be of interest, and views the contents thereof. When each page is accessed, the user uses a "find-in-page" search to determine whether the keyword is actually found in the document and if so, the context of its use. It is also problematic that the user has to select a "next" link to get another page of 20 page titles to view. Sometimes it can take tens of seconds or more to access the next set of titles. It would be desirable to have a web browser with built-in intelligence that could automate the process of wading through irrelevant search results. Other related client-side search acceleration techniques are also needed to allow a user control over searching instead of being limited by the abilities of a distant server's search facilities.

The concept of metadata aids in the computer manipulation of web-based information such as web sites. XML (extensible markup language) uses metadata to describe the content of resources such as web pages. A dialect of XML is called RDF (resource description framework). RDF supports the notion of a pointer so that graphs may be represented in a computer readable format. For example, a web site may be described using an RDF description. The RDF description can be written to contain a set of searchable properties to describe each web page in the web site hierarchy. The properties of each RDF-described web page can include a pointer to a page pointed to by that page. In this way a computer manipulatable site map representation may be maintained by the a server. When this information is made available to another computer, the other computer can then read the site map and perform operations thereon. This can improve the ability of a search engine to search a site, for example.

Another technology of interest is remote object technology. Remote object technology is defined form use with object-oriented programming environments. One example of an object oriented programming environment is the Java™ from Sun Microsystems Inc. Java™ defines objects that execute over a "virtual machine." The virtual machine is a software model of a generic machine. A Java™ object is compiled into a virtual machine language known as "bytecodes." The bytecodes are then translated by the virtual machine (or a just-in-time compiler) to run on the native processor of a target platform. An example of a distributed object technology is RMI™ (remote method invocation). RMI™ is a Java™ based distributed object technology. Another example of a distributed object technology is CORBA (common object request broker architecture). The aforementioned distributed object technologies are known in the art.

Distributed object technology allows object-oriented classes to be defined that include a server-side remote object and a client-side object stub, also called a "proxy." The server-side remote object implements one or more services and a communication protocol to communicate with the client-side stub. The client-side stub provides the client with an API ("interface" in object-oriented programming terminology) to call functions (i.e., "invoke methods" in object oriented programming terminology). When a method is invoked on the client-side stub, a remote procedure call and a set of parameters are marshaled into a message and sent across a communication channel to the server-side remote object. The server-side remote object then receives the message, unmarshals the parameters, invokes the corresponding method on behalf of the client, marshals a set of results into a message, and sends the message back to the client.

Remote objects can be used to specify remote agents. A remote agent is a program that runs on a remote server node on behalf of a client. A remote agent can be defined as a static remote agent or a mobile agent. A mobile agent is a process that migrates from a first machine to a second machine to a third machine. For example, the first machine passes an object to the second machine and the object is executed in the second machine. After some processing, the mobile agent migrates to the third machine. In some cases the mobile agent clones itself or otherwise spawns off more agent objects to execute on the third machine. Mobile agents can be used to specify a query or to carry information, for example. A remote agent object is static if it only runs on the second machine but never migrates or clones itself to run on a third machine.

It would be desirable to have a smart browser technology that could allow a client to control multilevel operations on a remote server site. For example it would be desirable for a client to specify an operation such as generating a list of all pdf files downloadable from a given company's web site. It would be desirable for a smart browser to specify a search for all documents on a web site that contain a keyword or meet a set of criteria. It would be desirable to have fast methods to go through a set of results returned by a search engine. It would be desirable to provide a technique whereby a smart browser could interact with a server to customize, manipulate, and/or prune a set of returned results to more rapidly highlight and locate desired information. It would be desirable to have a distributed object framework whereby a smart browser could identify a set of multilevel operations and have these multilevel operations carried out on behalf of the client on a remote server. It would be desirable to have a system whereby a client could specify a mobile agent to carry out client-defined filtering and/or multilevel operations. It would be desirable for the client-created mobile agent to execute remotely on one or more network servers to carry out the tasks as specified by the client.

SUMMARY OF THE INVENTION

The present invention overcomes difficulties with prior art web browsers by providing novel searching techniques. Instead of considering a network search engine to be an external server, the web browser of the present invention takes on search engine functionality. While prior art web browsers offer "find in page" word-search capabilities, the web browser of the present invention allows users to search for words and/or concepts using a multilevel search. In a multilevel search, a user specifies a set of search parameters plus a number of levels to search. In some case the number of levels to search may be set by a default value or may be derived intelligently on-the-fly.

The smart web browser of the present invention uses RDF and/or distributed object technology to perform multilevel operations. In a preferred embodiment, the smart web browser instantiates a client side proxy object that communicates with a server side remote object, using for example the RMI or the CORBA distributed object protocols. The server side remote object presents an interface to the client side remote object. The interface presented by the server allows the client to submit executable objects. That is, the server-side remote object provides an execution environment for objects submitted by the client for execution. The client then uses the client-side stub (proxy) to send an object that provides a software definition for a multilevel operation. The server-side remote object then allows the object submitted by the client to run. The submitted object causes multilevel web browser operations to be executed in the server on behalf of the client. The client then marshals the results and returns them to the client. In some case the server returns a URI (uniform resource identifier) or a URL (uniform resource locator) and the client subsequently access the results using standard HTTP or other web based application layer protocols. The remote runtime environment where the remote agent runs is called an agent sandbox. The agent sandbox is preferably implemented over a virtual machine.

In one embodiment, for example, the smart web checks a currently loaded page for a search term. If the term is not found, the smart browser passes a search request object to the remote server using a remote method invocation. The search request is packaged as Java bytecodes defining an executable multilevel search operation. The server then checks each page hyperlinked to the current page. If any of the linked pages contain the desired word or concept, that page is flagged for the user to view. The search may be performed in the server with the assistance of an RDF description of each page. The words or related information may be similarly stored in alternate vectored formats for fast database searching. The user can then press a "find next" button to continue the search. Alternatively all of the results can be logged and loaded up for viewing similar to a search engine results page.

In accordance with an aspect of the present invention, while the user is viewing a first result, the server can optionally seek out further results in the background. This methodology is useful because documents in the search may need to be gathered from diverse network addresses and may incur delays. Multilevel searches involving web pages or other web resources located on the same server can be searched quickly. When a hyperlink leads from a first server to a second server, the first server creates a distributed object and forward the search request to the second server. In some cases the search request is modified by the first server, for example by indicating a number levels the search has already undergone. In accordance with another aspect of the invention the user may select an option that causes some or all of the pages within a linked tree of documents to be printed without the need to view each page and then manually select "print page."

Other aspects of the present invention allow a user to build a sitemap to characterize and otherwise extract information from a linked structure of web pages. Another aspect of the present invention enables enhanced searching of both single-level and multilevel documents. The "find in page" search is expanded to allow users to specify combinatorial searches that are applied to document substructures.

The present invention allows a client and a server to interact in a novel way so that the client and server can cooperate to perform client-defined multilevel browsing operations. This takes control away from the server and puts it in the hands of an intelligent client such as a smart web browser. Presently a user is at the mercy of a poor search engine. Using prior art methods, when a search engine is incorporated into a web site, the user has no option but to select the provided search engine. Even when the user can select search engines, the search engine often provides unrelated results. The present invention puts controls in the hands of the user that automate the processes involved in sifting through results and looking for specific types of documents that may be found on a given web site. The present invention also allows a user to automatically characterize the contents of a web site by building a sitemap or a filtered site map. The processes and structures of the present invention vastly improve user productivity for performing web-related tasks.

The present invention also makes use of distributed object technology and/or mobile agent technology to enhance the speed at which client-initiated multilevel browsing operations can be processed. As will be discussed, the present invention minimizes the amount of network bandwidth needed to support multilevel browsing and reduces overall network bandwidth requirements in many cases. The present invention reduces the amount of network traffic generated to the client. This is useful, for example in minimizing the amount of data packets transmitted to and from the client in a wireless system.

BRIEF DESCRIPTION OF THE FIGURES

The various novel features of the present invention are illustrated in the figures listed below and described in the detailed description which follows.

DETAILED DESCRIPTION OF THE PREFERRED EMBODIMENTS

Figure 1:
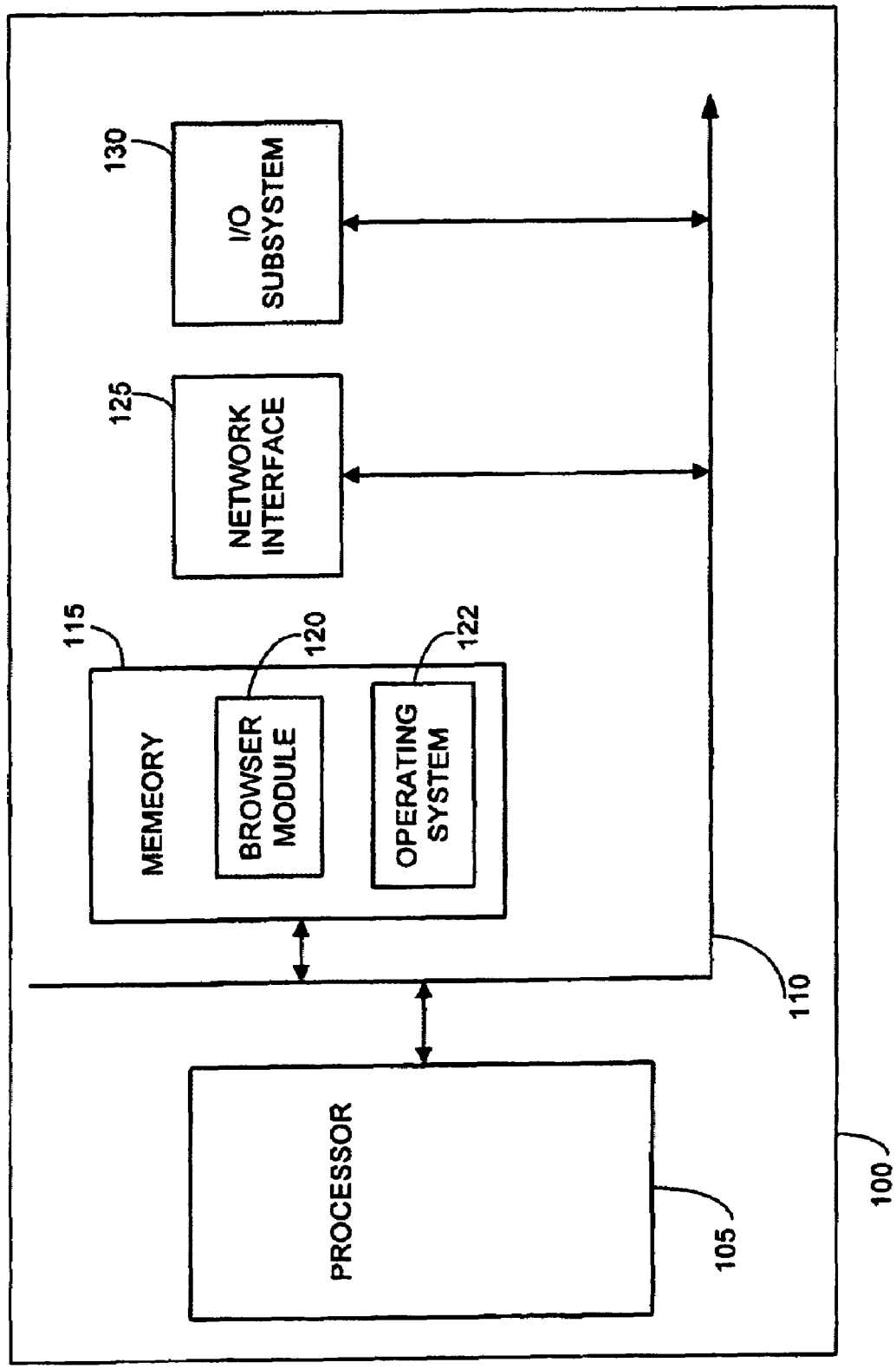
FIG. 1 is a block diagram illustrating a computer system in accordance with the present invention that us configured to with a multilevel browser program.

FIG. 1 is a block diagram representing an embodiment of a computerized device 100 designed in accordance with the present invention. The computerized device may be embodied as a desktop computer, a handheld computer, a networked web appliance, a cellular or PCS phone, or may be integrated into another type of system such as a home entertainment system. Skilled artisans will readily realize the device 100 may be implemented in various types of housings and may be embedded into various types of systems without departing from the scope of the present invention.

The computerized device 100 includes a processor 105. The processor 105 may be implemented using a standard microprocessor such as a Pentium™ processor from Intel Corp., a RISC type processor, or any other processor or microcontroller. The processor 105 is coupled to a bus 110. The bus 110 may be implemented in some systems using a hierarchical plurality of busses connected via bus bridges. Such hierarchical bussing systems are common in workstations and PC's. For example the bus 110 may include a local bus bridged to a PCI bus, and the PCI bus may be bridged to an ISA bus. All such configurations, to include a simple external processor bus are examples of the generic bus 110. Coupled to the bus 110 is a memory 115. Again the memory 115 may be implemented using a single memory device or may be implemented with a plurality memory devices arranged in a hierarchical cache based structure. The memory 115 may also be implemented as any combination of SRAM, ROM, EEPROM, and DRAM, and disk for example. The memory 115 includes bit-codings for a browser module 120. The browser module encoded into the memory 115 is designed in accordance with the present invention. In systems where the memory 115 includes DRAM or SRAM and a disk, the browser program will typically be loaded from the disk into the DRAM or SRAM and executed out of the DRAM or SRAM. If the browser is stored in EEPROM or ROM, it may be loaded into RAM or executed directly from the nonvolatile memory.

The memory 115 also preferably includes an operating system 122. The operating system provides software to allow application programs such as the web browser 120 to communicate with hardware resources. In specialized devices the application functionality of the web browser 120 may be merged with the operating system 122, or a dedicated micro kernel may be developed. Even in specialized hand held devices it is preferable to separate hardware layer and application layer functions using a standard version of the operating system 122. The operating system 122 is preferably implemented as a Windows NT™, Windows 2000™, or Windows CE™ operating systems from Microsoft, Inc., Solaris™ from Sun, or any other commercially available operating system. Various other operating systems are being developed for the wireless handheld market. The selection of the operating system 122 is a design detail that does not weigh into the scope of the present invention.

Also coupled to the bus 110 is a network interface 125. The network interface 125 may be a network interface card (NIC), an analog modem, or a faster modem such as an xDSL or cable modem. If the device 100 is a handheld device, the network interface may include a cellular or PCS connection or any other type of wireless network interface. In such systems the network interface may include cellular telephone functionality as well as wireless data services. A mobile IP protocol is preferably supported in the network interface of such systems.

The device 100 also includes an I/O system 130. The I/O system 130 preferably involves a display monitor and a set of display drivers. The I/O system also preferably involves an input device such as a mouse and/or keyboard/keypad. In some embodiments, the I/O system 130 may involve an audio interface. In such systems web content is provided to the user using text-to-speech and inputs are accepted via speech recognition. In general, the I/O system provides a means for the user to interact with the web browser module 120. Any subset of the components of the computerized device 100 may optionally be integrated onto a single IC die.

The operation of the computerized device 100 follows standard computer techniques. The novel aspect of the computerized device 100 is encoded into the browser module 120. The browser module 120 and its operation are discussed in connection with the subsequent set of figures.

Hence the details of program execution-operation of the computerized device 100 is understood to a skilled artisan in connection with FIGS. 2–6.

Figure 2:
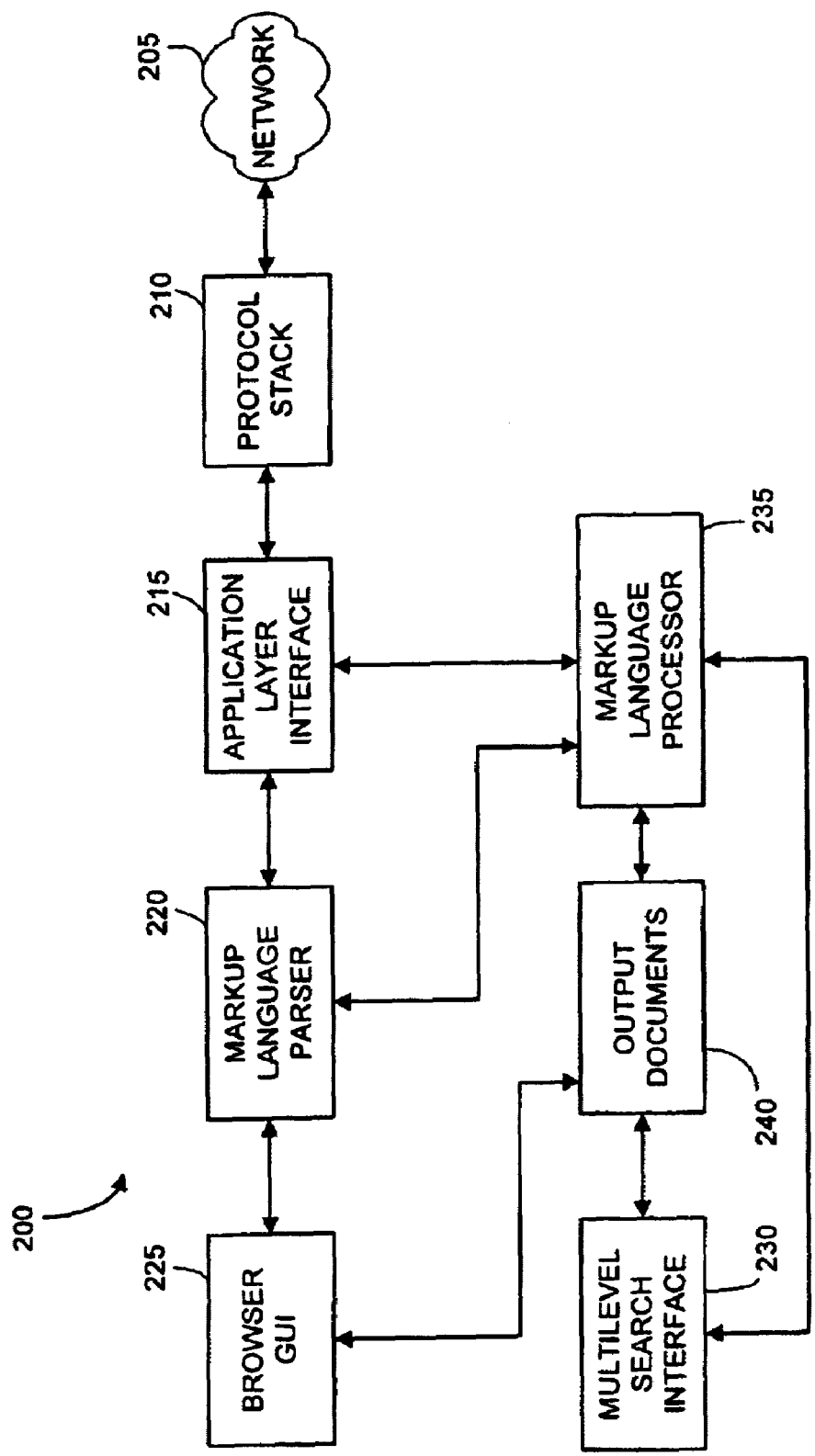
FIG. 2 is a block diagram representing an embodiment of a browser module with multilevel search capabilities.

Referring now to FIG. 2, block diagram representative of an embodiment of a multilevel-search web browser 200 is illustrated. The web browser 200 is coupled to a network 205. The network 205 may be any type of network such as a wireline, wireless, or optical network. The network 205 represents the Internet, a corporate intranet, a PCS data services network, or any other combination circuit switched and/or packet switched networks. In order to describe a preferred embodiment, without limitation, the network 205 will be considered to be the Internet henceforth.

The web browser 200 is coupled to the network 205 using a protocol stack 210. The protocol stack 210 may be part of the browser software in specialized devices, but is preferably supplied by the computer operating system 122. In most embodiments the protocol stack 210 is a part of the operating system 122 or the network interface 125 as opposed to the web browser module 120, 200.

The web browser 200 interfaces to the protocol stack 210 via an application layer interface 215. The application layer interface typically implements at least aspects of the hypertext transfer protocol (HTTP). As web browsing evolves, it is contemplated that other protocols may replace HTTP. Hence the application layer interface 215 may in general implement any application layer interface. The application layer interface 215 may likewise implement session layer and presentation layer functionality in accordance with the OSI model.

The application layer interface is operatively coupled to a markup language parser. The markup language parser parses the application layer information. In current systems the application layer data typically involves HTML web pages. A newer technology known as XML allows customized markup languages to be designed. Various dialects of XML are being developed. Hence the language parser may parse HTML, any type of XML, or more generally any type of markup or document-structure language. For example the language parser 220 may parse VoiceXML, also known as VXML. In preferred embodiments, the markup language parser parses a markup language document that is received via the application layer interface.

The markup language parser 220 is coupled to a browser GUI (graphical user interface). The GUI may involve a standard web browser GUI as is currently provided by the Netscape Navigator™ or the Microsoft Explorer™. Alternatively, the browser GUI may be specialized for use with hand held devices. The Spyglass Prism™ is an example of a web browser designed for use with small-screened handheld devices. Also, the browser GUI may involve a voice interface as is common on VXML based systems. Hence the browser GUI may use audio signals instead of graphic signals. In general, the browser GUI is a user interface that allows a user to interact with the web browser to enter network requests and to receive (view or hear) information obtained from the network. The browser GUI may involve a mouse, pointer device, a speech recognition interface, a set of buttons, or standard windows based display.

Coupled to the browser GUI 225 is a multilevel search control interface 230. The multilevel search interface 230 allows a user to enter information specific to a browser-initiated multilevel search. A preferred embodiment of the multilevel search interface is discussed in further detail in connection with FIG. 3. The multilevel search interface 230 is typically implemented in the same technology as the browser GUI 225. The multilevel search interface 230 may be an integral part of the browser GUI 225 or may be implemented as a plug-in, for example using JAVA™ technology from Sun Microsystems, Inc. The multilevel search interface 230 may also be implemented using XML or VXML voice I/O or may otherwise be specialized for use with small screen devices using dedicated physical buttons or other specialized input means.

The multilevel search interface 230 is operatively coupled to a markup language processor 235. The markup language processor 235 is also operatively coupled to the markup language parser 220. The markup language processor is optionally operatively coupled to an output document 240. The output document 240 may be stored in the memory 115, to include disk. The output document is also coupled to the browser GUI 225. It should be noted that a given embodiment may omit certain connections and may use some connections shown as bidirectional in only one direction. The embodiment shown may be pruned down to meet such embodiments or other couplings may be added without departing from the scope and spirit of the present invention.

In operation, the browser 200 receives a web page via the protocol stack 210 into the application layer interface 215. For example, the web page may be an HTML web page containing search results from a web server's search facility. To understand the invention, consider an example where the returned results include 400 hits, listed at 20 hits per page. Each listed "hit" corresponds to web page title or content-summary information and a hyperlink to a web site. In this example the search engine returned a lot of "junk," i.e., pages that do not even contain the keywords specified in the initial search. The user then specifies via the multilevel search interface 235 a "one-level search" with a "next-to-end" and a keyword. The "one level search" means to check each hyperlink referenced in the results page for the keyword, but not to check any further. That is, no hyperlinks on any pages referenced from the results page will be accessed. The "next-to-end" parameter instructs the browser to follow the "next" link all the way to the end. Recall that the search engine returns 20 results per page and the user needs to click the "next" hyperlink at the bottom of the page to get to the next 20 results.

With the search specified, the markup language parser 220 parses the loaded web page. In one embodiment the markup language parser 220 optionally first checks the currently loaded page for the keyword. This is useful especially for searches where the current page is not a results page but a page of text mixed with hyperlinks. In this example the keyword is not found in the currently parsed results page. Hence the parser detects each hyperlink in the results page and activates each one. Next it parses the returned page and searches for the keyword. If the keyword is found, the browser either starts building a "filtered results page" or displays the returned page to the user with the keyword highlighted. In this second embodiment, the user can click "find next" to continue the search.

In a preferred embodiment, while the user is viewing a given page, the browser makes one or more subsequent network accesses in the background. Hence while the user pauses to review the use of the keyword in a given page, the browser is automatically making one or more other accesses to load up a next page for searching and reviewing. The operation of the web browser 200 is explained in further detail in connection with FIGS. 3–6.

A second example of the use of the browser involves evaluating a web site. Suppose a user visits a web site run by a company. The user is performing research about this company and its products. In some cases the company has a search engine and in other cases it does not. All too often the search engine provided by the company is inefficient. An example use of the present invention for processing results of an inefficient search engine is given above.

In the second example, the user wishes to search all web pages starting at a route web page for a word or a concept. A concept may be specified as a Boolean keyword search or a natural language search expression, or a compartmentalized search entry-form, for example. The user enters the concept and indicates to search to the deepest level found on the present server. That is, hyperlinks will be followed until they lead to a different server or a server operated by another network entity. The search operates similarly to the one described above, except the tree structure specification of the search differs.

The user may also select other options such as "download pdf files" or "print all pages" or "print all pages meeting search criteria." Similarly the search may stop when a pdf file is found or a page with the keyword is found, and the user may then make the print or download decision. In another embodiment the system reports the total number of pages to print or pdf files to download before going ahead with those operations. This prevents undue waste in cases where there is more information than anticipated. The present invention also optionally builds a tree-structured sitemap of the web site and optionally lists specified types of resources found. For example each node may include a title, number and titles of pdf files, number of links, number of occurrences of keywords, whether or not the page matches a Boolean criterion, or other user-specified information to be collected. A method for building a sitemap is discussed in more detail in connection with FIGS. 4 and 5. The sitemap information is sent to the output document 240. The output document 240 is read by the browser GUI 225 for interactive user viewing and manipulation.

Figure 3:
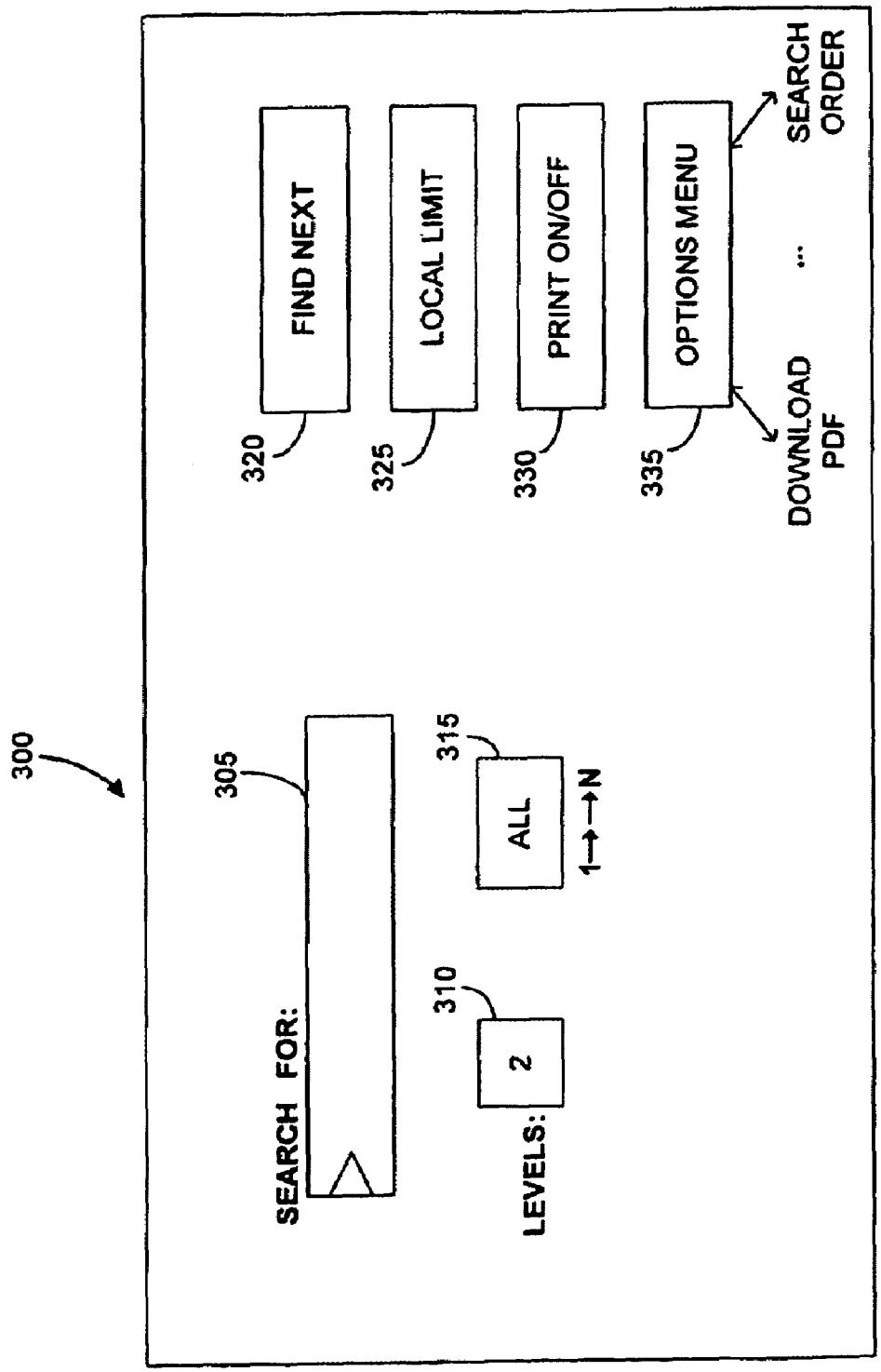
FIG. 3 is a block diagram illustrating an exemplary GUI window used to control multilevel search-based browsing in accordance with the present invention.

Referring now to FIG. 3, an exemplary multilevel GUI dialog window 300 is illustrated. In a preferred embodiment the multilevel GUI window 300 is implemented as a computer window superimposed on a computer display monitor. In alternative embodiments the multilevel GUI is implemented using dedicated keys, a VXML IVR (interactive voice response) interface, or a combination thereof. In general any user interface technology may be used.

The multilevel GUI dialog window 300 includes a search parameters window 305. The user may enter a word into this dialog box similarly to prior art "find in page" interfaces. In some embodiments, this window may also be used to enter Boolean keyword searches an/or natural language concept searches. The search parameters window 305 may be designed to accept one or more search parameters to be used with any desired search methodology.

The multilevel GUI dialog window 300 also includes a "number of levels" window. This window allows a user to specify the number of levels of hyperlinks to search for the search parameters. In applications where a web site is being characterized, the number of levels may indicate a number of levels to characterize, or may be set to "max domain." The "max domain" setting instructs the markup language processor 235 to keep searching without a specified depth, but not to follow any hyperlinks leading out of a given domain. This is useful for searching an entire web site. An optional "local limit" button 325 may be used to allow the user to set the "number of levels" parameter to max, while limiting the search to a local network domain. The local network domain may optionally be specified in terms of a URL. For example, the local domain may involve all network addresses whose root is http://www.abc_company.com/.

The GUI 300 optionally includes a 1->->N window 315. This window allows a user to specify how many "next page" links to follow. For example in a results page, the search may be specified as one level deep, except the search will follow the "next page" link until the end of the results page is reached. Alternatively the user may only desire to evaluate the first ten pages, especially if the pages are arranged from most probable to least probable as is common with most search engines. This parameter is generally set to a number of "next page" links to follow. The default is preferably set to "max."

The multilevel GUI 300 also includes a "find next" button. This is used to allow the user to seek the next instance of the search criterion being met. This is similar to prior art "find next" buttons that work in document word searches. The "find next" button of the present invention is able to work across hyperlink boundaries. Moreover, it can be used to search for concepts other than simple words. This function may be used in a single document as well. In a preferred embodiment, the present invention will highlight or otherwise move to a paragraph whose words satisfy a Boolean keyword expression.

The print on/off control 300 may involve an options pull-down menu. The print on/off may be used to specify to print all pages scanned in a search. For example a user may wish to print all pages from a company's web site. Pull-down options allow a user to be more selective in only printing pages meeting the search criterion.

The options menu 335 is preferably a pull down menu providing further options. For example a user may with to build a tree structured map of a given web site. Certain information may be desired about each node in the map. For example the number and titles of pdf files linked to at each node may be of interest. Also, the user may with to download all pdf files meeting a certain criterion. The options menu allows for future expansion. Various other web-based functions may be automated using the options menu. Other options possibilities will become apparent in connection with the discussions of FIGS. 4 and 5. The GUI 300 may be developed using known techniques to provide control of the functionality discussed in connection with FIGS. 4 and 5. Likewise, other options may be added to save users time in web-page manipulation oriented tasks by following the general teachings of the present invention.

One example how the options menu may be used is to enable a user to find a PowerPoint™ presentation about a certain subject. The user may enter in a set of keywords to a network search engine. This may result in thousands of hits. Now the user may specify to build a map of all pages reachable from up to three levels of hyperlinks from any of the pages returned in the search results. In this case the user specifies to build a sitemap file containing all pages including hyperlinks to files with a .ppt extension. When the map page is constructed, the user may click on a given link in the map page to access the link. Alternatively the results can be showed to the user one at a time, and the user can press the "find next" button 320 to move to the next node having a .ppt file. While the user is reviewing a first result the browser preferably continues the search for one or more subsequent results in the background. More details regarding methods to construct map page documents are provided in connection with FIGS. 4 and 5.

Figure 4:
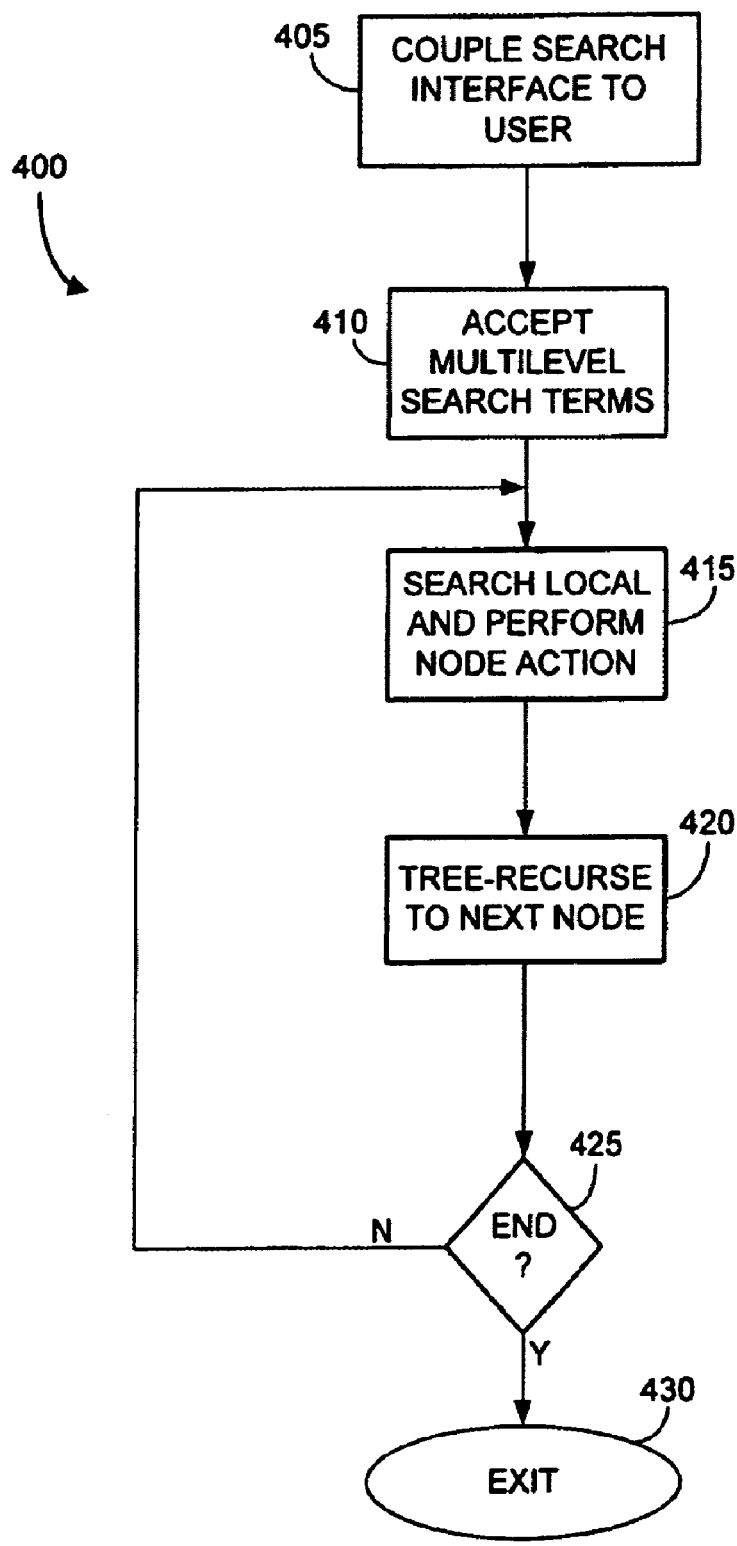
FIG. 4 is a flow chart illustrating methods of browsing involving an automated recursive tree-walking process.

Referring now to FIG. 4, a method 400 is illustrated in block diagram form. This method is performed by the web browser 200 and is coded into the browser module 120. Note that the method 400 may also be implemented by a processor plug-in module. In XML based systems, the method 400 may be optionally encoded directly into an XML accessed by an XML based browser. That is, in XML systems, browser functionality may be added by XML documents containing program code without the need for a plug-in module. All such embodiments are contemplated by the present invention.

In a first step 405, a multilevel search interface is coupled to a user. The multilevel search interface may be a constructed similarly to the GUI window 300. In a given system the step 405 may involve a VXML IVR interface or a more specialized interface including special buttons. Also "hot keys" or "short cuts" as are known in the art may be employed. The step 405 accepts user inputs to allow the user to interact with the method 400 in order to specify a set of multilevel search parameters. These preferably involve at least some of the parameters discussed in connection with FIG. 3.

In a second step 410 the multilevel search parameters are accepted. These multilevel search parameters are used to configure a search program that is executed by the markup language processor 235. In a third step 415 the multilevel search parameters are applied to a local node. The local node corresponds to the web page that has most recently been accessed and has been processed by the markup language parser 220. For example, the web browser 200 displays the root node's web page on the display 130 while steps 405 and 410 are being executed. Once the search begins, the markup language processor causes other pages to be accessed, and the currently accessed page is called the "local node." The step 415 may be optionally skipped or executed on the root node.

The step 415 involves evaluating the markup document corresponding to the local node and performing a node action. The node action may involve searching the local node for a word, concept, link to file type, or other designated set of search criteria. This generally involves parsing the local node document, extracting tagged substructures, and interpreting them in the context of the markup grammar. That is, the step 415 generally can search text and can search for text within specific types of tags. This allows the search engine to be able to specifically search for hyperlinks to certain file types, extract headings, and provide other functions as are subsequently discussed. In one example the node action is to display the part of the page meeting the search criteria to the user and wait until the "find next" button is pressed before continuing. While waiting for the "find next" button to be pressed, this exemplary node action continues the search in the background to prevent the user from having to wait for subsequent hyperlinks to be accessed.

In another embodiment, the node action may involve logging information into a sitemap document. The sitemap document may similarly be constructed as a filtered results summary document, whereby the filter uses a browser-controlled multilevel set of search criteria. In this type of embodiment the markup language processor 235 works with the markup language parser to continue to search through all nodes and keeps a record of a tree structure or list of hyperlinks to nodes that meet the search criterion. In this case the method usually continues along without the need for the user to issue the "find next" command. Other node actions may involve downloading files of certain types or printing out web pages. Further details of building sitemap documents and filtered results summary documents are described in connection with FIG. 5.

Depending on the multilevel search configuration, either after the "find next" command is issued or automatically, control next passes to a fourth step 420. In the step 420 a tree recursion is performed to select a next local node. For example, the next local node is generally the next hyperlink in a given base page. The tree may be searched using a depth-first or a breadth-first technique for example. The step 420 generally involves maintaining a return-stack as is known in the art in order to move back up the tree when a boundary is reached. For example when a three-level search is underway, the current local node is a level-two node, and all of the hyperlinks in the level-two node are exhausted, the next local node is the next hyperlink in the parent level-one node. Recursive tree and linked list traversing algorithms are well known in the art of computer science and any such algorithm may be used to implement the step 420. Before any hyperlink is accessed, it is preferably compared to a history list and skipped if it would cause a loop. This ensures the integrity of a loop-free tree structure.

After the step 420, a condition 425 is evaluated. The condition 425 determines whether all of the nodes specified by the multilevel search have been processed. If not, control passes back into the step 415. If so, control passes to an exit point 430. Depending on the embodiment and/or multilevel search settings, at the end of the method 400 the user will either have viewed all of the results, or will have a sitemap or filtered results document. The sitemap and filtered results document structures include a structured set of hyperlinks to all pages meeting the search criteria. In some cases the search criterion may be left open to cause a sitemap to be built to all pages in a given domain. Also, if certain options such as print or download options were specified, those actions will also have been completed or may still be underway when the exit point 430 is reached.

The present invention contemplates a wide variety of possible node actions that be performed during the step 415. For example a user may wish to sequentially step through/ view all .gif or all mpg image files on pages meeting certain criteria. A user may also wish to build a local map of those pages and be able to view the images at a later time. In such a case the process builds an image tree. Preferably this operation may occur in the background so the user can move to another window and perform other tasks or perform other tasks with the same browser during these background operations. Other examples of node actions that can be performed during the step 415 include but are not limited to: 1) display text to user, wait for a "find next" command, and keep doing this until the end of each document is reached; 2) link URL of current node to a site-map structure; 3) link URLs of files found on current node and having a specified type(s) to the sitemap structure, for example to .pdf or .ppt files; 4) generate a headings list for the current node in the site-map structure; 5) print out current web page; 5) download one or more linked files of a specified file type to a local directory; 6) display an image file; 7) add the URL and title information to a filtered search results output list-page.

Number 4) above is an example of mark-up specific searching. In this example the search parameter involves not a keyword but a tag type. The markup processor 235 searches for headings tags found in the parsed markup file stream. When a heading is found, it is loaded into the site-map file. This provides a table of contents structure for the web site. Additional mark-up may be added by the markup processor 225 make the output look like a table of contents, for example. The generated map is preferably presented as an HTML or a given type of XML document. The markup language processor 235 preferably translates each heading into a hyperlink tag structure marked with appropriate entry point to the heading in the document in which it was found. This way the user viewing the map may select a given heading in order to access a portion of a document corresponding to the heading.

Figure 5:
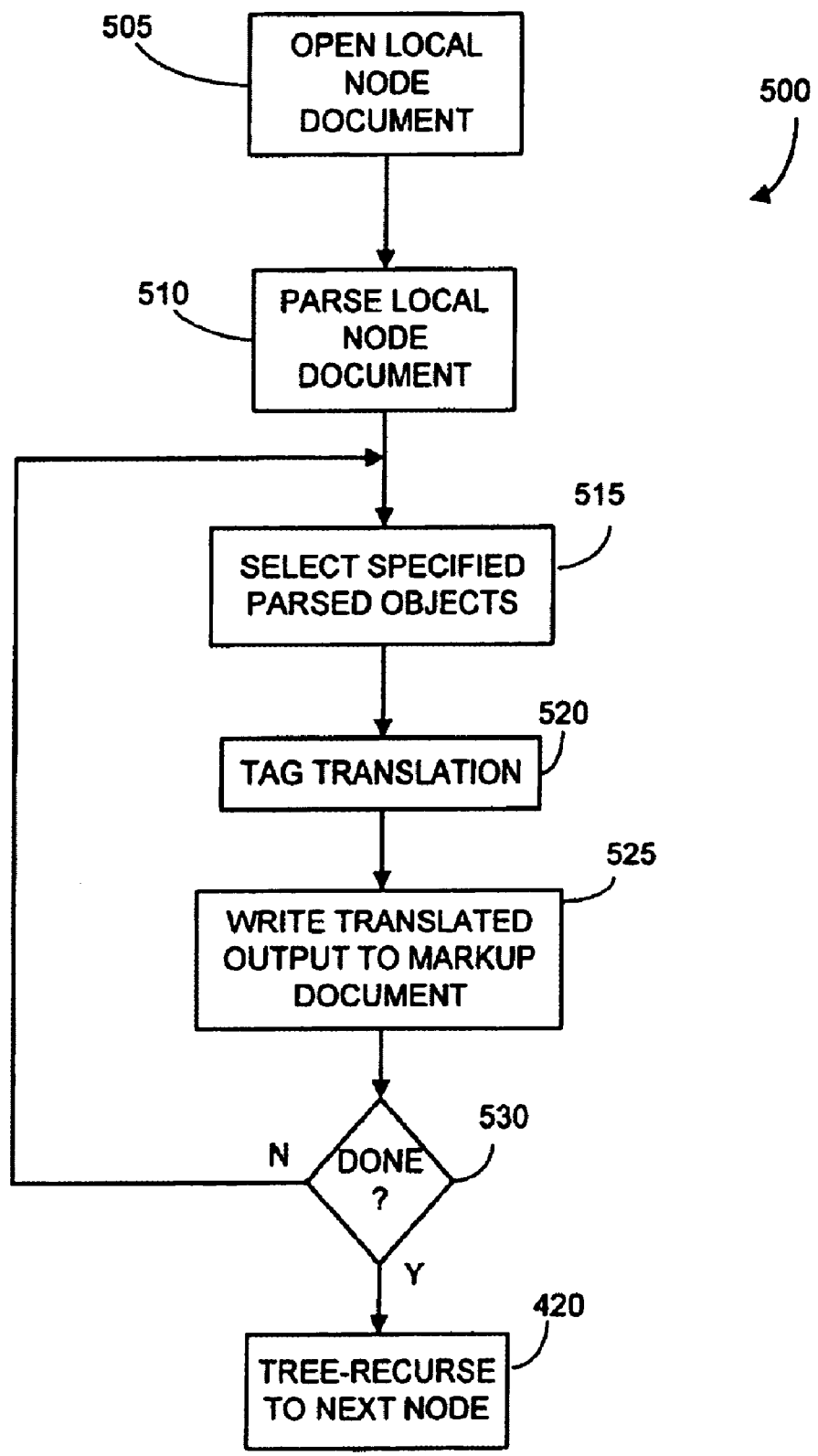
FIG. 5 is a flow chart illustrating a sub-method of building a site-map document.

Referring now to FIG. 5, an embodiment of a method of building a sitemap 500 is illustrated in block diagram form. The method 500 can also be used to generate a filtered results page. A "filtered results page" is similar to a sitemap but only includes pages meeting a given set of criteria. In general a filtered results page may be applied to a search engine's results pages or to a web site. The filtering operation builds a map but only includes pages of particular interest to a user. In some cases the sitemap or filtered results page may be arranged as a list of hyperlinks with ancillary information, and in other cases the sitemap or filtered results page may be arranged according to a tree structure. In a preferred embodiment, the sitemap output is formatted to look like a table of contents. The filtered results are preferably formatted to look like a search engine results page. In general the concepts of a sitemap, a filtered results page, and a filtered sitemap are all special cases of the concept of a sitemap. Filters may be applied to prune out unwanted results using browser-controlled, second level searching techniques.

The method 500 corresponds to one exemplary embodiment of the step 415 of the method 400. That is, the method 500 is preferably wrapped into a control loop as specified by the method 400. When configured in this way, the step 410 also includes the step of setting up an output document to hold the sitemap. This is typically performed by opening a new markup language output document to hold the sitemap information. The step 410 then also involves writing a set of document tags and any other document header information needed to initialize a new markup document. In this case the markup language processor 235 is operative to write output to an output file structure 240. In a preferred embodiment, the step 410 opens an HTML document. In another preferred embodiment the step 410 involves opening an XML document with an associated document type definition.

To build a sitemap, then, the method 400 is applied with the step 410 augmented as described above. The method 400 proceeds whereby the step 415 involves linking a node into a tree structure. During site-mapping operations, the step 420 is preferably performed using a depth-first ordering policy. During sitemap or filtered sitemap building operations, when the step 415 is called in the method 400, the method 500 as described below is invoked.

In a step 505 a local node is accessed and opened. The local node corresponds to the current markup document in the search. The local node starts at the root node of the search and is thenceforth determined by the step 420. In a second step 510 the information of the local node is parsed. The local node generally corresponds to a markup document. Control next passes to a third step 515 that scans the parsed document for specified types of information. This may involve search-text, tag types (e.g. headings tags), file types or other specified criteria. Note that the steps 510 and 515 may be merged so that parsing and searching are performed in a pipelined sequential order. The block diagram of FIG. 5 represents only one possible ordering, and other orderings would be apparent to skilled artisans.

Control next passes to a fourth step 520. In the fourth step 520 the information extracted from the local-node document is passed through a tag translation. The tag translation may generally involve switching from one set of tags to another. This step may also involve encapsulating a first set of tags into another set of tags. A null translation may also be applied, whereby no translation is performed. An example of a tag translation is when each headings tag is being added to the site-map output document. These tags may be encapsulated in hyperlink tags and URL/URI information may be added to the hyperlink tags so that when a user selects a heading, the browser brings up the local-node document and displays the portion of that document containing the heading to the user. An example where a null translation may be used is when the parsed object corresponds to a downloadable file whose file name is already nested within in a hyperlinked set of tags.

Control next passes to a fifth step 525 where the selected parsed and translated objects are written to the output markup file structure. After the writing is complete, control is determined by a decision 530. If the end tags of the parsed document are encountered control passes to the step 420. Otherwise control passes back to the step 515 where scanning through the parsed document continues. In an alternative embodiment control passes back to the step 510 and continued parsing is interleaved with the selecting, translation and writing operations.

Figure 6:
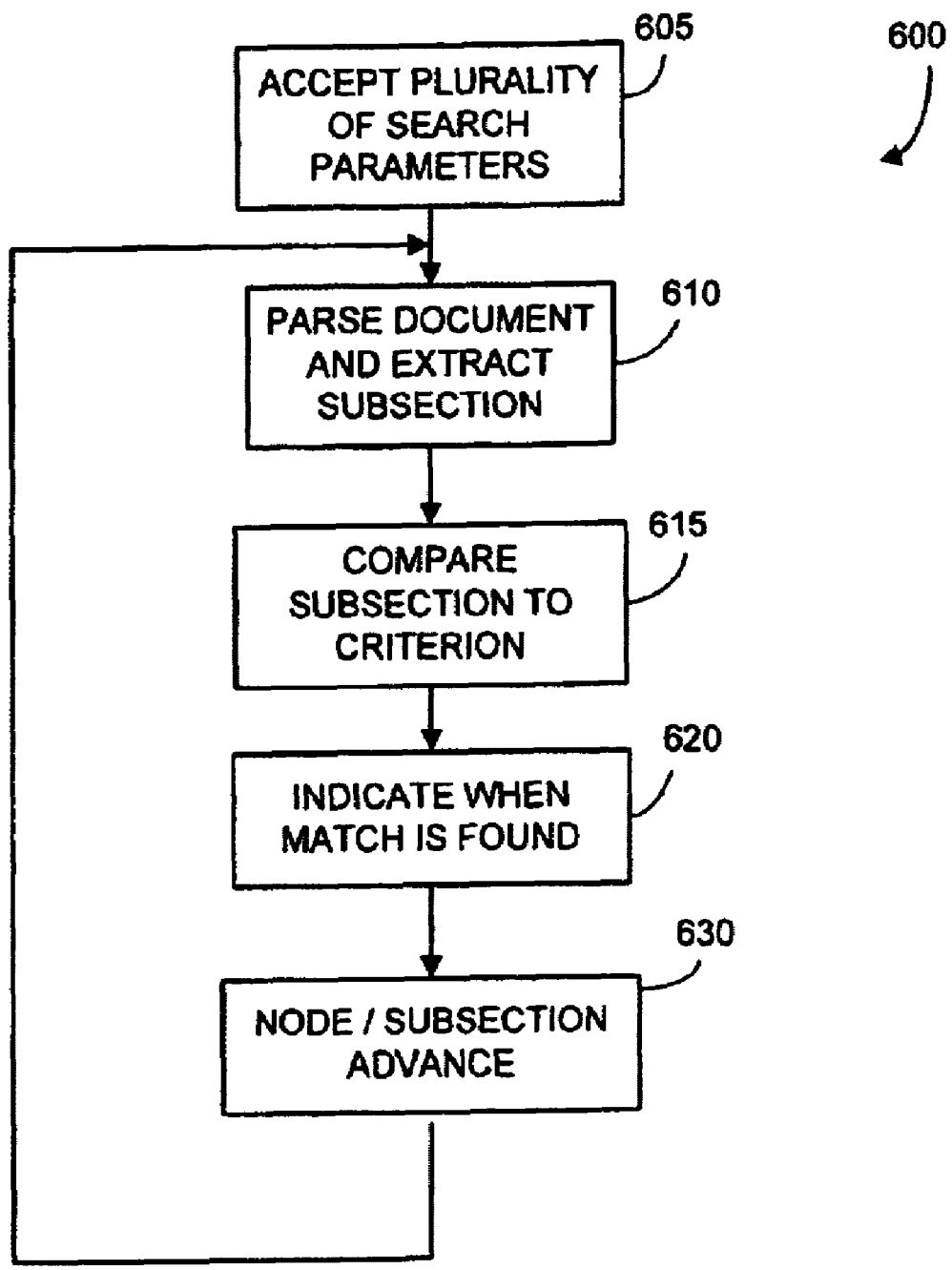
FIG. 6 is a flow chart illustrating a method of searching a document.

Referring now to FIG. 6, a method of searching a document 600 is illustrated in flow chart form. This method improves on prior art "find in page" search functions and is also used in multilevel searches. In a first step a plurality of search parameters are accepted from a user. In a second step 610, a document is parsed and subsections are extracted therefrom. If the document is already open, parsing typically begins from the point where the user presently has the text-input marker or cursor. A subsection may be a paragraph in a word processing document, a cell in a spreadsheet, or any specified tagged object type in a markup document. The subsection may be tag-type independent, i.e., the subsection may be a paragraph or a heading.

In a third step 615 the subsection is treated as a sub-document and a search criterion is applied to the subsection. For example the search be specified as "dog AND tail" or "dog WITHIN 10 WORDS of tail." The step 615 compares each parsed subsection to the search criterion. In a fourth step 620 match results are indicated to the user. For example the subsection of the document matching the search criterion is displayed on the output screen 130. If no match is found, the step 620 performs a null operation. If no match is found, or the user hits the "find next" button, control next passes to a fifth step 630. In the sixth step 630, the parser advances to the next subsection and control next passes to the second step 610. If this search technique is used within a multilevel document structure and a hyperlink is encountered, the sixth step 630 performs the node-advance similarly to the step 420.

It should be noted that while prior art document search mechanisms provide "find in page," they lack the ability for a user to search subsections of the document using a more sophisticated search as described above. This inability leads to user inefficiencies and lack of control in manipulating single and hyperlinked document structures. This aspect of the present invention hence solves an important problem with a latent need.

Figure 7:
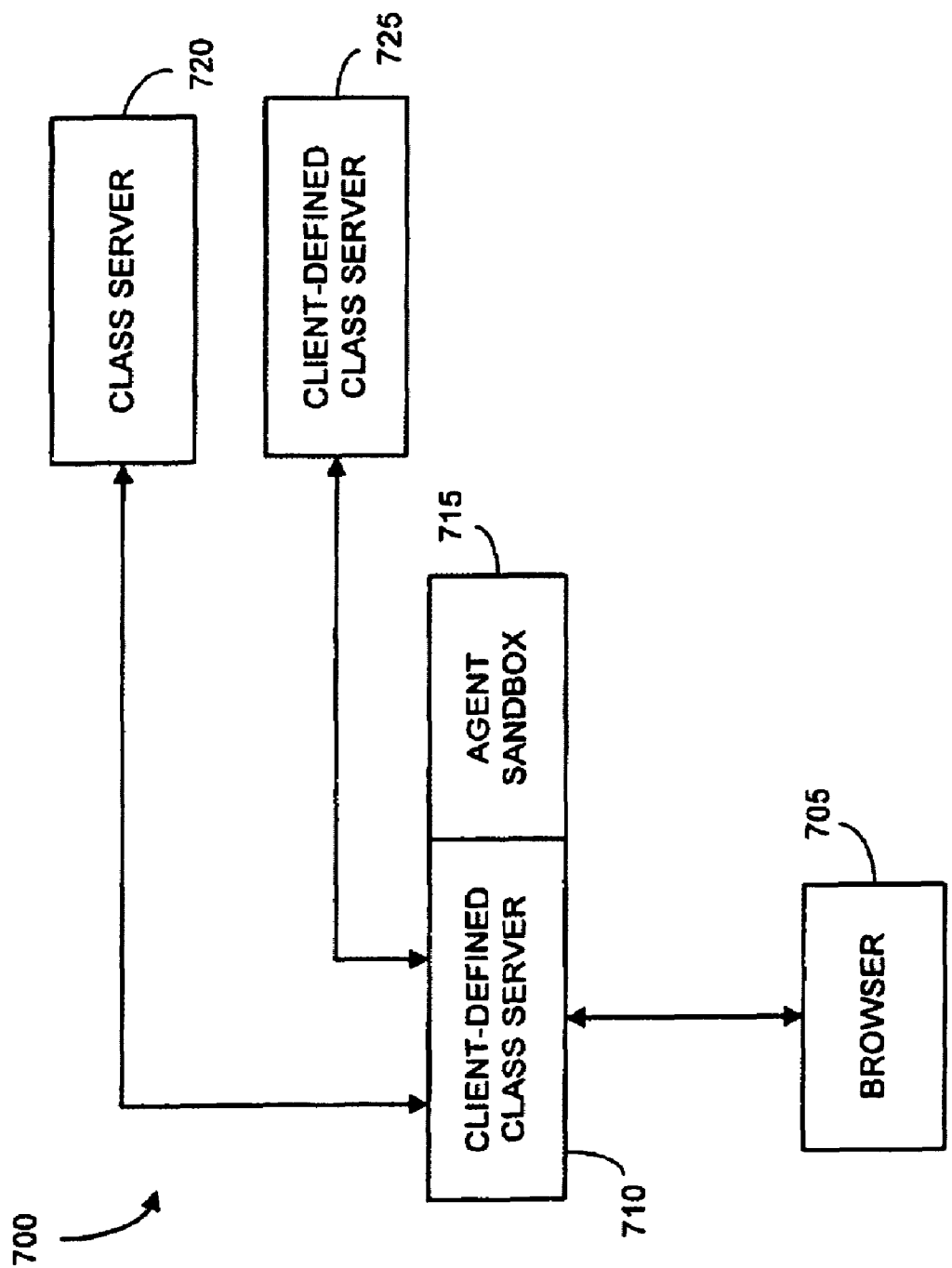
FIG. 7 is a block diagram illustrating a client-server configuration within a network using distributed objects to support multilevel browsing operations.
Figure 8:
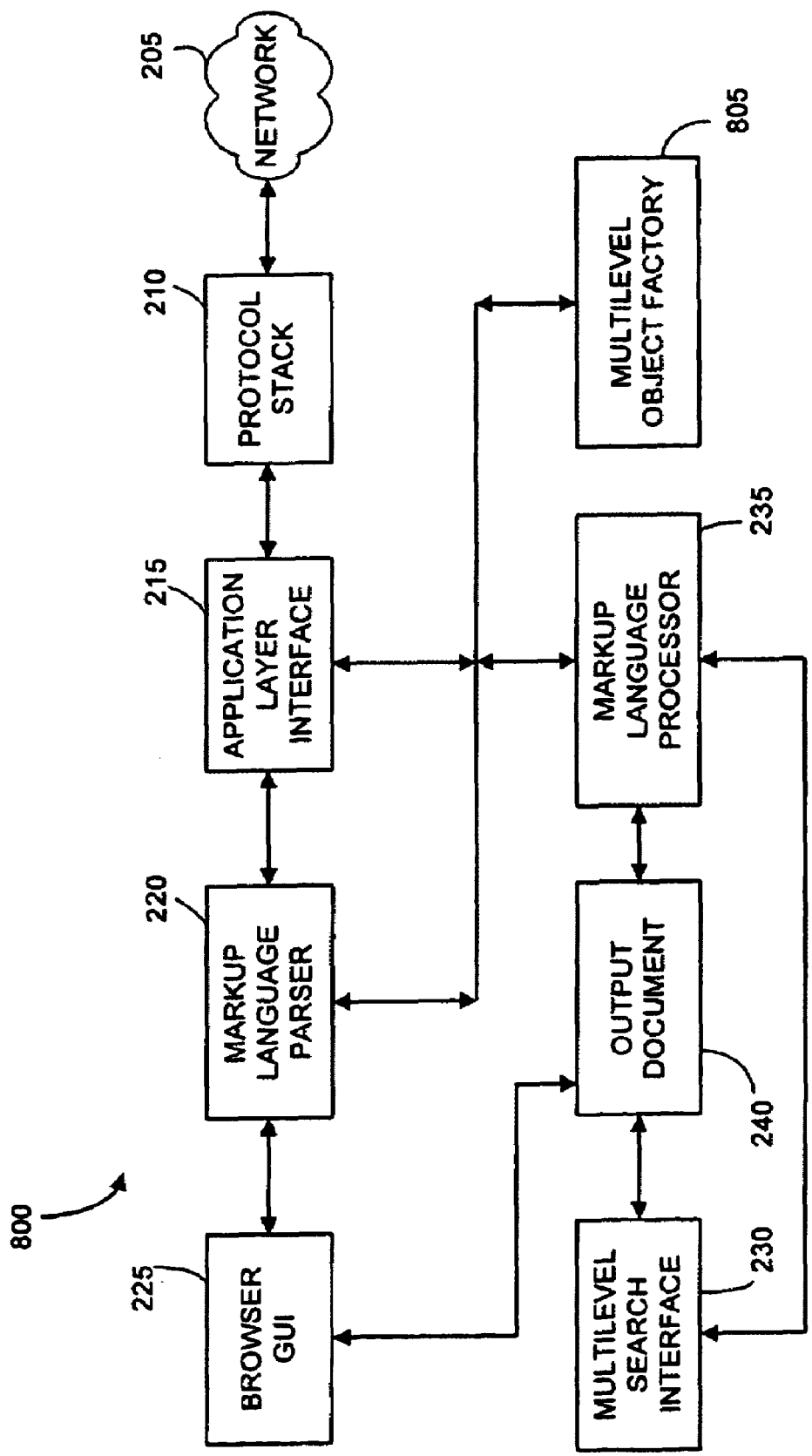
FIG. 8 is a block diagram representing an embodiment of a browser module with remote-agent-objected based multilevel search capabilities.
Figure 9:
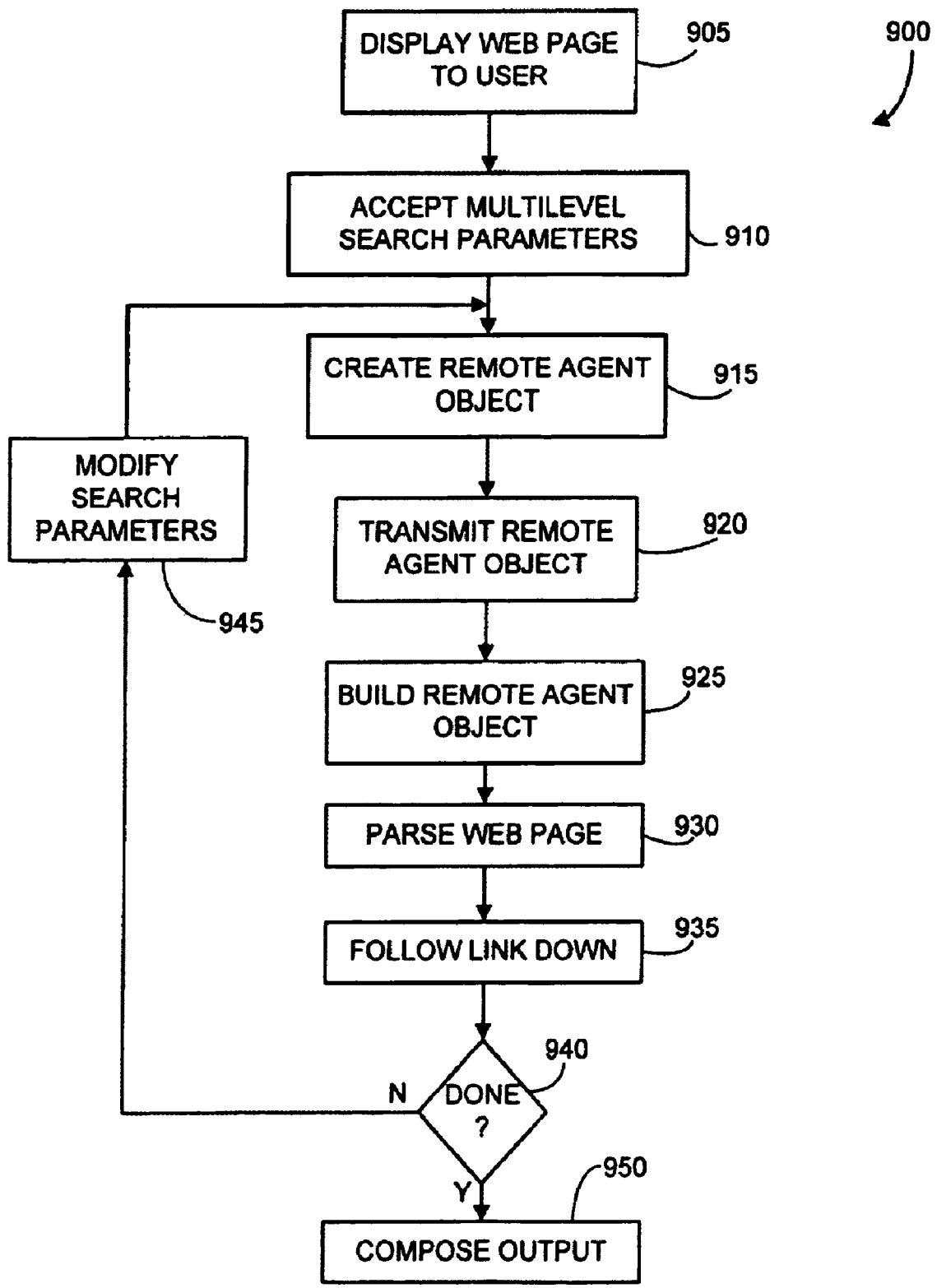
FIG. 9 is a flowchart illustrating a recursive multilevel browser operation.

The foregoing description of the invention in connection with FIGS. 1–6 was provided in the parent application. FIGS. 7–9 below and the description thereof are added in the CIP application. Some of the multilevel browser embodiments of the parent are directed to methods whereby web links are accessed to perform individual legs of multilevel searches. The disclosure below identifies remote-object-object based client-side and server-side structures and methods that allow the multilevel search operations to be performed more quickly and with less overhead. All of the methods discussed in connection with FIGS. 1–6 may be carried out using the remote-agent-object based approaches defined below. The approaches described in connection with FIGS. 7–9 may be considered to be alternative embodiments of aspects of the parent invention.

Referring now to FIG. 7, a block diagram of a network configuration 700 is illustrated. An intelligent browser 705 is connected via a network connection to a server 710. The network connection may be defined at a given network layer, and in the illustrative embodiment 700, the network connection is assumed to be an application layer connection that uses the HTTP or the HTTPD protocol. The server 710 is coupled to an agent sandbox 715. The agent sandbox 715 is preferably implemented as a Java™ virtual machine in the same computer or computer subnetwork as the sever 710. The agent sandbox provides an execution environment for remote agents (e.g., mobile agents). In some embodiments, mobile agents are not used, but the client passes a static object in a remote method invocation. The object then executes in the sandbox 715 to perform client-defined operations.

In some embodiments the agent sandbox 715 may reside in a separate server from the server 710. For example, the browser 705 may correspond to a wireless client. In such cases, if the server 710 does not host an agent sandbox, it may still be desirable to execute the client-specified object from a server remote from the server 710. This is because the link between the server hosting the agent sandbox 715 may have a much higher bandwidth connection to the server 710 than the wireless client 705. In another example, the client 705 may be in the U.S. while the server 710 is in China. In this example the server 710 does not host the agent sandbox 710, so another server in China that does host the an agent sandbox and also has a high speed connection to the server 710 is selected to run the executable object generated by the client 705.

Coupled to the server 710 via a network connection (e.g., an HTTP connection) is a class server 720. The class server 720, for example comprises a repository of Java™ classes whose methods can be invoked by the client's object. A class loading methodology is preferably used so that the client can invoke methods with predefined interfaces. This allows the client-generated object to be small and compact. That is, method invocations are high level. In a preferred embodiment, the server 710 includes a class server such as the class server 720. The optional class server within the server 710 preferably serves as a cache for commonly used classes. Pre-built objects corresponding to commonly used parametric searches and such are maintained in the server 710 and/or the sandbox's (715) runtime environment.

Also coupled to the server 710 is a client-defined class server. The client-defined class server 725 is optional, and serves as a repository for client-defined classes. This allows the a customized client request to be made to be very compact. For example the client can define a customized search method and submit a method invocation along with a set of search parameters. The agent sandbox 715 will then load the client-defined class from the client-defined class server 725. This is especially useful for cases where the client browser 705 is housed in a wireless device or some other bandwidth limited (or bandwidth-cost limited) device.

In operation, the client browser 705 submits a request to the server 710. The server 710 acts as the server as discussed in connection with FIGS. 1–6. Like the browser described in connection with FIGS. 1–6, the browser 705 is an intelligent browser that specifies multilevel operations. Instead of the browser 705 activating a plurality of hyperlinks, the browser submits a remote-agent object to the server 710. The server 710 then builds the object and passes it to the sandbox 715 for execution. In systems where the server 710 does not host the sandbox 715, a separate network connection to a proxy server that does host the sandbox 715 may be used (not shown). In this case the client preferably passes a reference to the page being viewed from the server 710 to the proxy server and the proxy server allows the client's object to execute. The client-defined object carries out any of the methods and/or functions defined in connection with FIGS. 2–6. By removing the need for the intelligent browser to activate hyperlinks while performing the multilevel operations, a significant amount of network traffic can be reduced.

Note that the server 710 still may be as deficient as the servers as discussed in FIGS. 2–6. By providing the agent sandbox 715, the server allows the smart client 705 to probe for and specify exactly what it needs. The server 710 does not need to be modified further. That is, the same set of web pages and built-in search engine provided by the server 710 may be used. The agent sandbox 715 is a generic piece of software that is added. This additional piece of software allows the smart browser 705 to reformat, filter and otherwise perform multilevel browser operations on information located at the server 710. In a preferred embodiment the agent sandbox 715 resides on the same server 710 as the related web site pages. This allows multilevel searches to be carried out without generating any further requests across the network, thereby speeding multilevel browsing operations considerably. As previously discussed, when the server 710 does host the agent sandbox 715, a nearby server that does host the agent sandbox 715 is selected. Here the term "nearby" preferably represents a network metric such as a router cost function.

Referring now to FIG. 8, a smart browser according to the present invention is illustrated in block diagram form. The browser 800 may be implemented by augmenting a standard browser with a plug in module. Note the commonality between the smart browser 800 and the browser 200 of FIG. 2. Only one new block is added, a multilevel object factory 805. All of the previous connections between blocks remain in tact, although many of these connections are optional and can be omitted in a given embodiment. The multilevel object factory 805 has optional coupling to the markup language parser 220, the markup language processor 235, the output document 240 and the multilevel search interface 230. In some embodiments one or more of these couplings may be present. The multilevel object factory is also coupled to the application layer interface 215. In the smart browser 800, the markup language processor 235 is optional and the functions carried out by the markup language processor 235 are carried out completely or partially by the object created in the multilevel object factory 805. For this reason, the markup language parser 220 is also optional in the smart browser 800.

When the present invention is implemented as a plug-in module, the blocks 230 and 805 are included in the plug-in module. The blocks 220 and 235 may also be included in some embodiments of the plug-in module. Again, these blocks are optional when remote-agent-objects are used.

In operation, the smart browser 800 acts to perform essentially the same functionality as the browser 200 and the operations discussed in connection with FIGS. 2–6. However, the smart browser 800 performs these operations in a different way. The browser returns a page of information from the network 205 and displays it via the browser GUI 225. The user uses the multilevel search interface 230 to specify a multilevel operation such as a multilevel search or a multilevel print as previously described. Instead of having the markup language processor 235 orchestrate the set of multilevel operations by activating a plurality of hyperlinks, the request is forwarded from the multilevel search interface 230 to the multilevel object generator 805.

The multilevel object factory 805 is operative to specify the request for a multilevel operation. The multilevel object factory generates a remote agent object. The remote agent object is preferably an object-oriented program that invokes one or more methods to perform the multilevel operation (e.g., a multilevel search or multilevel "find in page"). The methods invoked by the object are defined by an interface. The methods are instantiated by objects defined by classes. As discussed in connection with FIG. 7, the class descriptions defining the instantiations of the methods may reside on an external server such as any of the servers (or server processes) 710, 715, 720, or 725.

The multilevel object factory preferably generates the remote agent object and passes the object to a remote server (e.g., 710, 715, 720, or 725) using a distributed object protocol such as CORBA or RMI (remote method invocation). In a preferred embodiment, the remote agent object is passed to the server 710. In this example the server 710 is the server that supplies the search engine results page or other company related web information as discussed in the examples in connection with FIGS. 2–6. In the preferred embodiment, classes are then loaded to support the object from any of the servers 710, 715, 720 and/or 725. Once loaded, the remote agent object is allowed to execute in the agent sandbox 715.

Note that the remote agent object created in the multilevel object factory 805 may be a mobile agent or a static agent. In other words, the object created in the multilevel object factory 805 may or may not be able to transit to another server node in the network. In all cases, executable code is allowed to execute remotely on at least one network server. Once in the agent sandbox 715, the remote agent object is allowed to orchestrate a multilevel operation such as the multilevel "find in page" operation as previously described. The object can optionally clone itself or create sub-objects and pass them to other machines pointed to by hyperlinks in the graph that defines the multilevel search (e.g., a tree N levels deep).

An advantage to performing the multilevel browsing operations using remote agent objects is to offload the requirement for the markup language processor to activate a full set of hyperlinks as defined by the search graph of the multilevel search interface 230. The search can be carried out much faster if it is conducted at the target server or servers. That is, if the multilevel graph spans multiple servers, it may be advantageous to spawn off sub-search objects to run on each target machine. Mobile agent technology is known, as are programming practices in CORBA and RMI used to create processes that run on remote servers. The present invention can be embodied using known remote object and mobile (or static) agent programming practices to implement the methodologies and systems of the present invention. Moreover, server-side metadata such as RDF descriptions can be used for example, to supply sitemaps and assist in locating web-based information in some cases. These advantages are especially useful for cases when the smart browser 800 is implemented in a wireless device.

As previously discussed, some embodiments include the markup language parser 220, the markup language processor 235, and the multilevel object factory 810. In such embodiments, the markup language parser 220 is preferably operative to parse a markup language document received via the application layer interface 215. The parsed document is passed to the markup language processor 235 to create a first-level hyperlink map. The hyperlink map is used to represent the set of hyperlinks pointed to by the page in the browser. The hyperlink map is then used as a state parameter for the remote agent object. The remote agent object uses this hyperlink map as a launch-off point for performing a multi-level browser operation. When the remote agent object executes in the agent sandbox 715, it will follow down the links in the hyperlink map and will then repeat the process of the markup language parser 220 and the markup language processor 235 to recurse to lower levels. In some embodiments the remote agent object will spawn off new remote objects when the hyperlink graph points to different network nodes.

In other embodiments, the remote agent object waits until it is at the remote server and then performs the operations of the markup language parser 220 and the markup language processor 235. Note that these elements (220 and 235) will be needed in the remote agent object to carry out successive levels of the multilevel operation. Moreover, this approach requires less state to be sent with the remote agent object, thus saving bandwidth. In such embodiments, all that is needed is a URL to the current web page (or point therein) and a search definition. With server-side class loading, the as little as a single method invocation is required in the remote agent object created in the factory 805. This allows compact agent objects to be transmitted in support of multilevel browser operations.

From FIG. 8 and the previous discussion of FIGS. 2–6, it can be seen that the browser 800 is representative of an embodiment of a smart browser, also called an intelligent browser. The browser includes the application layer interface 215 that is operative to receive at least one data packet. This data packet includes at least a portion of a target web page. The target web page may be a standard HTML web page, or may correspond to more general types of web data such as XML data or a VXML transaction, for example. The web page is presented to the user using the user interface. The user then uses the multilevel search control interface 230 to define a multilevel browser operation such as a filtering operation or a multilevel "find in page" operation, for example. Similarly, the multilevel browser operation may be specified to list or print all files of a certain type reachable from links in a finite graph of hyperlinks (e.g., a tree) reachable from the web page. The multilevel object factory 805 is coupled to receive a first input relating to the target web page and a second input from the multilevel search control interface. The multilevel object factory is operative to specify a remote object agent that orchestrates a multilevel browser operation based upon the first and second inputs. The remote object agent is exported from the web browser 800 to execute on a network server such as the server 710, 715.

It should be noted that the intelligent browser 800 may be implemented in a wireless device. In such systems, the I/O system of FIG. 1 includes wireless interfaces. These interfaces may include a cellular connection, a packet-over-cellular service, a packet radio connection (e.g., wireless LAN or WAN) and an electronic positioning system receiver. The electronic positioning system receiver may be embodied as a global positioning system (GPS) receiver, or an indoor positioning system receiver (e.g., using electronic tag location methods), or a combination of both. In accordance with an aspect of the present invention, the electronic positioning system is used to derive a parameter used in the multilevel search. This parameter reports the locality of the intelligent client. This information may be used to cause a multilevel search to be limited to return results from web sites representing entities within a specified geographical area.

Referring now to FIG. 9, a client-server method 900 of intelligent web browsing is illustrated in flow chart form. The method 900 is representative of a system based method carried out between an intelligent web browser client and a remote server. The method 900 can also be broken down into submethods carried out respectively on the intelligent web browser client and the server.

In a first step 905, the web browser 800 displays a web page to the user. This typically involves a graphical representation of data but could also use other media such as an audio speech interface. In a step 910, a set of multilevel criteria is received from the interface 230. In a step 915, the multilevel object factory uses the present web page information and the multilevel search definition to cause a remote agent object to be created. As discussed earlier, the remote agent object can be as simple as a method invocation and a parameter list.

In a step 920 the remote agent object is transmitted from the client 705, 800 to a server (e.g., 710). In a step 925 the remote agent is built at the remote server (e.g., 710). This may involve class loading and object building, or may involve referencing an already existing object, for example when the remote agent corresponds to a well-known method invocation. In a preferred embodiment an object is instantiated to support the remote agent functionality. In some embodiments a set of bytecodes are passed to a server-side remote object that provides an execution environment for the bytecodes.

In a step 930, the remote agent parses web page information based on input URL data. This web page initially corresponds to the web page being viewed in the browser 705, 800. In a step 935, the remote agent causes a hyperlink to be accessed. In the case of a company web site, the hyperlinks followed in the step 935 may be local to the server (e.g., 710).

As discussed in connection with FIGS. 3–6, the remote agent object provides support for a multilevel browser operation. For example, the remote agent object assists a multilevel "find in page" search. In a step 940 an end condition is evaluated to determine whether all of the links in the multilevel operation have been followed. If the end condition is not satisfied, control passes to a step 945 where an the search parameters are modified. This generally corresponds to switching the current URL to the URL pointed to by the link followed in the step 935. Bookkeeping data is also updated to maintain position in the tree graph defining the multilevel browser operation.

When the step 945 is executed, control passes back to the step 915. This time, instead of being executed in the client, the step 915 is executed in the server. This happens, for example, when another remote agent object is to be created and passed to another server as indicated by the hyperlink. In many iterations of this loop, no extra remote agent object is spawned. In such iterations, the step 915 is considered to be a null pass-through event.

In cases where the step 915 is executed, then the step 920 is executed to pass the newly created remote agent to its destination for execution. For iterations where the step 915 is a null pass-through step, the step 920 is also a null pass-through step. Likewise, for iterations where the step 915 is executed, the step 925 is also executed in the destination server. The steps 930 and 935 are next executed by the agent. For iterations where no new agent was spawned or migrated, the steps 930 and 935 are executed in the same agent as the previous iteration of the loop. When the done condition is finally satisfied, control moves to an output-composition step 950.

Note from the above, that the method 900 can be implemented by a single remote agent object to as many as one remote agent object per hyperlink in the multilevel search graph. Depending on the graph structure and client and/or server settings, a given embodiment of the method 900 might generate one or some intermediate number of remote agent objects.

In the step 950, results are coupled back to the user. These results may be generated by more than one remote agent, in which case the book keeping data is used with the graph structure of the multilevel search to properly order the outputs for the user. Note in some embodiments the multiple passes through the step 915 cause a new remote agents to be spawned and in other cases cause a single remote agent to migrate to a different server node. In a preferred embodiment, agents are only selectively spawned or migrated if a decision is made to do so. This decision preferably takes into account the multilevel graph structure and network delays or router cost parameters. It deemed to be desirable to provide non-null invocations of the step 915 only when network bandwidth costs warrant it. Otherwise too much overhead is incurred in the steps 915, 920, and 925.

Note that the method 900 with repeated occurrences of the steps 915, 920 and 930 eliminated is very similar to the web browser of the parent application. The difference is that this version of the method 900 runs on a remote server in the agent sandbox 715 as opposed to the smart browser 200. This potentially reduces the number of network transactions needed to support multilevel browsing operations. The same functionality described in connection with FIGS. 2–6 can be performed by the smart browser 800 and the method 900. The method 900 makes use of the network system configuration 700.

Although the present invention has been described with reference to specific embodiments, other embodiments may occur to those skilled in the art without deviating from the intended scope. Therefore, it is to be understood that the invention herein encompasses all such embodiments that do not depart from the spirit and scope of the invention as defined in the appended claims.

What is claimed is:

1. A computerized device, comprising:
a processor; and
a memory device, wherein the memory device contains computer readable instructions for execution by the processor, the computer readable instructions being for execution by a client-side software module that comprise:
a user interface for interacting with a user and for identifying a target web page;
a multilevel search control interface configured to accept at least two parameters, to include a first parameter that defines a content based search string and a second parameter that indentifies a linked set of documents that are linked via one or more levels of hyperlinks to the target web page;
a portable executable program code that is responsive to the at least two parameters, and is programmed to perform a multilevel search to search each of the documents specified in the linked set of documents for content that matches the content based search string;
a network based program module that causes at least a portion of the portable executable program code to be transmitted to a server that is adapted to accept the portable executable program code and to execute the portable executable program code after it is received from the computerized device;

wherein at least a portion of the portable executable program code that has been transferred from the computerized device is permitted to execute at the server, and upon execution, the portion of the portable executable program code that is executed at the server orchestrates a multilevel search to cause the documents in the linked set of documents to be analyzed to determine whether they match the content based search string, and to couple back to the computerized device a selected zero or more of the linked set of documents found to comport with the first parameter;

wherein each document in the selected zero or more of the linked set of documents includes content as defined by the first parameter and is guaranteed to be a member of the linked set of documents as defined by the second parameter; and wherein the first parameter is not re-entered into any embedded search engines found in the linked set of documents or any other search engines to extend the search beyond the linked set of documents.

2. The computerized device of claim 1, wherein said user interface comprises a window display providing an interactive menu to a user.

3. The computerized device of claim 2, wherein said window display is a part of a windows based graphical user interface.

4. The computerized device of claim 1, wherein each of the selected zero or more of the linked set of documents is automatically downloaded by the client-side software module to create a local representation of the linked set of documents.

5. The computerized device of claim 1, wherein each document found in the search is downloaded and a local sitemap representative of the linking structure of the linked set of documents is created by the client-side software module.

6. A computerized device, comprising:

a processor; and a memory device, wherein the memory device contains computer readable instructions for execution by the processor, the computer readable instructions being for execution by a client-side software module that comprise:

a user interface for interacting with a user and for identifying a target web page;

a multilevel search control interface configured to accept at least three parameters to include i) a first parameter that defines a content based search string, ii) a second parameter that identifies a set of linked set of documents that are linked via one or more levels of hyperlinks to the target web page, and iii) a third parameter that specifies one or more file types as defined by one or more file name extensions;

a portable executable program code that is responsive to the at least three parameters, and is programmed to perform a multilevel search to search each of the documents having the specified file type and being in the linked set of documents for content that matches the content based search string, wherein each document in the linked set of documents can be reached from the target document via a sequence of hyperlinks which each point to a respective document within the linked set of documents;

a network based program module that causes at least a portion of the portable executable program code to be transmitted to a server that is adapted to accept the portable executable program code and to execute the portable executable program code after it is received from the computerized device;

wherein at least some of the portable executable program code that has been transferred from the computerized device is permitted to execute at the server, and upon execution, the portion of the portable executable program code that is executed orchestrates a multilevel search to cause the documents in the linked set of documents to be analyzed to determine whether they match the content based search string and also meet the file type specification, and to couple back to the computerized device a selected zero or more of the linked set of documents found to comport with the first and third parameters;

wherein each document in the selected zero or more of the linked set of documents is of the specified file type, includes content as defined by the content based search string, and is guaranteed to be a member of the linked set of documents; and wherein the first parameter is not re-entered into any embedded search engines found in the linked set of documents or any other search engines to extend the search beyond the linked set of documents.

7. The computerized device of claim 6, wherein said client-side software module is operative to search for all documents with an extension of .ppt within the linked set of documents.

8. The computerized device of claim 6, wherein said client-side software module is operative to download all of the selected zero or more of the linked set of documents.

9. For use in a client computerized device, a method comprising the steps of:

obtaining application data from an application layer interface;

passing said information to a user via a user interface;

coupling a multilevel-search interface to a user via the user interface, the multilevel search interface being configured to accept at least two parameters, a first parameter that defines a content based search string and a second parameter that identifies a set of linked set of documents whose documents are each constrained to be linked via one or more levels of hyperlinks from a target web page and to have a hyperlinks address that is within the boundaries of a specified domain of hyperlink addresses;

transmitting a multilevel search specification to a remote server, wherein said multilevel search specification causes the following multilevel-search acts to be executed in one or more remote servers:

(i) accessing a first markup language document and scanning said first markup language document to determine a hyperlink contained therein;

(ii) determining whether the hyperlink points to a document whose URL address falls within the boundaries of the specified domain of hyperlink addresses; and if the hyperlink was found to fall within the boundaries of the specified domain of hyperlink addresses:

(iii) retrieving at least a portion of the document pointed to by said hyperlink found in said accessing;

(iv) comparing the contents of the document pointed to by said hyperlink to at least a portion of said content based search string; and (v) coupling back to the client computerized device the document pointed to by said hyperlink if the comparison has a positive result;

wherein each document coupled back to the client computerized device as a result of the multilevel-search acts is guaranteed to be a member of the linked set of documents defined by the second parameter and to include content as defined by the first parameter; and wherein the first parameter is not re-entered into any embedded search engines found in the linked set of documents or any other search engines to extend the search beyond the linked set of documents.

10. The method of claim 9, wherein said content based search string includes a Boolean keyword expression.

11. The method of claim 9, wherein said computerized device is a wireless mobile device and said at least two parameters further i comprise information derived from an electronic positioning system.

12. The method of claim 9, wherein said multilevel search specification futher comprises a portable executable program code that orchestrates the following act:

evaluating the results of the comparison and when said act of comparing reveals a match to the content-based search string, coupling information related thereto to the user, and when said step of comparing does not yield a match, checking to see if the search is complete, and if it is not, accessing a next hyperlink and repeating the acts of accessing, determining, retrieving, comparing, and coupling.

13. The method of claim 12, wherein said repeated act of accessing further comprises:

when said information has been coupled to said user, awaiting a find-next signal, and when said find-next signal is received, checking to see if the search is complete, and if it is not, accessing a next hyperlink and repeating the acts of accessing, determining, retrieving, comparing, and coupling.

14. The method of claim 9, wherein said at least two parameters include a Boolean keyword expression, an indication of the number of levels to search, and an indication to continue the search on a designated-next-linked page.

15. The method of claim 9, wherein said hyperlink points to a metadata description of a web resource and said step of accessing involves accessing a file containing metadata relating to said resource.

16. The method of claim 9, wherein the document pointed to by said hyperlink found in said accessing comprises a metadata description, said metadata description being described using a resource description framework (RDF) based language.

17. For use with a client-side computing device, a method of seeking information that is located in an information network, the method comprising the steps of:

accessing a web page via said information network using a client-server transaction;

presenting said web page to a user via a user interface;

receiving via the user interface one or more multilevel search parameters to define multilevel search parameters to define a multilevel browsing operation over a set of documents;

receiving via the user interface a content based search parameter;

specifying in said client-side device a multilevel search specification comprising a first parameter that defines a content based search specification and a second parameter that identifies a linked set of documents that are linked via one or more levels of hyperlinks from the web page, and transmitting the multilevel search specification to a remote server that is adapted to execute a multilevel search in response thereto;

wherein the remote server, in response to the multilevel search specification causes a set of specified links who are within N hyperlink hops of the web page to be searched for the content based search parameter, and causes to be coupled back to the client-side computing device a selected zero or more of the linked set of the documents found to comport with the first parameter;

wherein each document in the selected zero or more of the linked set of documents is guaranteed to be a member of the linked set of documents as defined by the second parameter and to further include content as defined by the first parameter; and wherein the first parameter is not re-entered into any embedded search engines found in the linked set of documents or any other search engines to extend the search beyond the linked set of documents.

18. The method of claim 17, wherein the multilevel search specification is limited by not following any hyperlink that points outside of a specified domain as defined in a URL specification.

19. For use in servicing a multilevel search request from a remote client-side computerized device, a server-side computerized device, comprising:

a processor; and a memory device, wherein the memory device contains computer readable instructions for execution by the processor, the computer readable instructions being for execution by a server-side software module that comprising:

an application-layer interface for interacting with a remote user associated with the remote client-side computerized device;

a multilevel search control interface configured to accept from the remote client-side computerrized device via the application-layer interface at least two parameters, including a first parameter that defines a content based search string and a second parameter that defines a linked set of documents that are each linked to a target web page via one or more levels of hyperlinks;

a search module that ia operative to implement a multilevel search based upon the at least two parameters which specify a multilevel search to search each of the documents specified in the linked set of documents for the content that matches according to the content based search string, wherein documents in the linked set of documents are characterized in that they can be reached from the target web page through a sequence of N hyperlink activations, where N is a member of the group consisting of fixed integer and a parameter that defines a domain in a URL specification used to bound the search to only follow hyperlinks leading from the target web pages and falling within a specified domain;

wherein the server executes the multilevel search to cause the documents in the linked set of documents to be analyzed to determine whether they match according to the content based search string, and to couple back to the client-side computerized device a selected zero or more of the linked set of documents found to comport with the first parameter;

wherein each document in the selected zero or moret of the linked set of documents includes content as defined by the first parameter and is guaranteed to be a member of the linked set of documents as defined by the second parameter; and wherein the first parameter is not re-entered into any embedded search engines found in the linked set of documents or any other search engines to extend the search beyond the linked set of documents.

20. For use in servicing a multilevel search request from a remote client-side computerized device, a server-side method, comprising:

interacting via an application-layer interface with a remote user associated with the client-side computerized device;

accepting from the client-side computerized device via the application-layer interface at least two parameters, including a first parameter that defines a content based search string and a second parameter that defines a linked set of documents wherein each document in the linked set of documents is a member of a group consisting of: documents linked to a target web page via one or more levels of hyperlinks, and documents whose respective hyperlink web addresses fall within a specified domain relative to a hyperlink base address;

implementing a multilevel search based upon the at least two parameters to cause each respective document in the linked set of documents to be analyzed to determine whether it respectively matches the content based search string, and if so, identifying it as a selected respective document; and for each selected respective document, selectively coupling back to the client-side computerized device information related to the selected respective document;

wherein each selected respective document includes content as defined by the first parameter and is guaranteed to be a member of the linked set of documents as defined by the second parameter; and wherein the first parameter is not re-entered into any embedded search engines found in the linked set of documents or any other search engines to extend the search beyond the linked set of documents.

21. The method of claim 20, wherein the information related to the selected respective document comprises the selected respective document.

22. The method of claim 20, further comprising:

accepting from the client-side computerized device via the application-layer interface a portable executable program code;

wherein the implementing the multilevel search is performed at least in part by execution of at least some of the portable executable program code.

23. The method of claim 20, wherein each document in the linked set of documents is a member of the group consisting of documents linked to the target web page via one or more levels of hyperlinks.

24. The method of claim 20, wherein each document in the linked set of documents is a member of the group consisting of documents whose respective hyperlink web addresses fall within the specified domain relative to the hyperlink base address.

25. The method of claim 24, wherein the second parameter is evaluated at least in part by accessing server-side metadata that supplies sitemap information to identify the documents in the linked set of documents.

26. The method of claim 20, further comprising:

accepting from the client-side computerized device via the application-layer interface a third parameter related to a current geographic location of the client-side computerized device, wherein the implementing the multilevel search is based upon the first, second and third parameters to cause each respective document in the linked set of documents to be analyzed to determine whether it respectively matches the content based search string, and additionally whether it meets a geographic location criterion, and only if it matches both the content based search string criterion and the geographic location criterion, then identifying it as a selected respective document.

27. The method of claim 20, wherein the client-side computerized device and the server side method utilize remote object technology, and the application layer interface comprises a remote object interface.

28. The method of claim 20, further comprising:

accepting from the client-side computerized device via the application-layer interface a third parameter that designates a file type;

wherein each document in the linked set of documents is a member of a group consisting of documents whose respective hyperlink web addresses fall within a specified domain relative to a hyperlink base address; and wherein the multilevel search is performed over all documents whose web addresses fall within the specified domain and the multilevel search further uses the third parameter to only identify a document as a selected respective document if the document is of the designated file type.

29. The method of claim 28, wherein the designated file type is a .pdf file type.

30. The method of claim 28, wherein the designated file type is a .ppt file type.

31. The method of claim 28, wherein the second parameter includes a user-entered text string that defines the domain.

32. The method of claim 20, further comprising:

accepting from the client-side computerized device via the application-layer interface a third parameter that identifies a subsection type which is a member of the group consisting of a paragraph type, a heading type, and a designated tagged object type;

wherein each document in the linked set of documents is a member of a group consisting of documents whose respective hyperlink web addresses fall within a specified domain relative to a hyperlink base address; and wherein the multilevel search is performed over all documents whose web addresses fall within the specified domain and the multilevel search further uses the third parameter to only identify a document as a selected respective document if the first parameter is matched by text found in the identified subsection type within the document.

33. The method of claim 32, wherein the second parameter includes a user-entered text string that defines the domain.

34. The method of claim 20, further comprising:

accepting from the client-side computerized device via the application-layer interface a third parameter that designates a file type; accepting from the client-side computerized device via the application-layer interface a fourth parameter that identifies a subsection type which is a member of the group consisting of a paragraph type, a heading type, and a designated tagged object type;

wherein each document in the linked set of documents is a member of a group consisting of documents whose respective hyperlink web addresses fall within a specified domain relative to a hyperlink base address; and wherein the multilevel search is performed over all documents whose web addresses fall within the specified domain, the multilevel search further uses the third parameter to only identify a document as the selected respective document if the document is of the designated file type, and the multilevel search further uses the fourth parameter to only identify a document as a selected respective document if the first parameter is matched by text found in the identified subsection type within the document.

35. The method of claim 34, wherein the second parameter includes a user-entered text string that defines the domain, and server-side sitemap metadata is used to identify which documents are present in the domain.

36. The method of claim 34, wherein the first, second, third, and fourth parameters are entered by a user of the client-side computerized device via a user interface.

37. The method of claim 20, further comprising:
accepting from the client-side computerized device via the application-layer interface a third parameter that identifies an image file whose image file type is a member of the group consisting of a .gif image file type and a .mpg moving image file type;

wherein each document in the linked set of documents is a member of a group consisting of documents whose respective hyperlink web addresses fall within a specified domain relative to a hyperlink base address; and wherein the multilevel search is performed over all documents whose web addresses fall within the specified domain and the multilevel search further uses the third parameter to only identify a document as a selected respective document if the first parameter is matched by text associated with the image file.

38. The method of claim 37, wherein the file type is a .gif file type.

39. The method of claim 38, wherein the second parameter includes a user-entered text string that defines the domain, and server-side sitemap metadata is used to identify which documents are present in the domain.

40. The method of claim 37, wherein the file type is a .mpg file type.

41. For use in a client-side computerized device, a method, comprising:
interacting via an application-layer interface with a remote server that is adapted to perform multilevel search operations;
accepting from a user via a user interface at least two parameters, including a first parameter that defines a content based search string and a second parameter that defines a linked set of documents wherein each document in the linked set of documents is a member of a group consisting of: documents linked to a target web page via one or more levels of hyperlinks, and documents whose respective hyperlink web addresses fall within a specified domain relative to a hyperlink base address;
passing via the application-layer interface the first and second parameters to the remote server so that the remote server can implement a multilevel search based upon the at least two parameters to cause each respective document in the linked set of documents to be analyzed to determine whether it respectively matches the content based search string, and if so, to identify it as a selected respective document, and for each selected respective document, the remote server selectively couples back to the client-side computerized device information related to the selected respective document;
accepting via the application-layer interface the information related to each selected respective document coupled back from the remote server as a result of the multilevel search performed by the remote server;
passing to the user via the user interface a representation of the information related to each selected respective document coupled back from the remote server;
wherein each selected respective document includes content as defined by the first parameter and is guaranteed to be a member of the linked set of documents as defined by the second parameter; and
wherein the first parameter is not re-entered into any embedded search engines found in the linked set of documents or any other search engines to extend the search beyond the linked set of documents, 42. The method of claim 41, wherein the information related to the selected respective document comprises the selected respective document.

43. The method of claim 41, further comprising:
sending to the remote server via the application-layer interface a portable executable program code;
wherein the multilevel search is performed at least in part at the remote server by execution of at least some of the portable executable program code.

44. The method of claim 41, wherein each document in the linked set of documents is a member of the group consisting of documents linked to the target web page via one or more levels of hyperlinks.

45. The method of claim 41, wherein each document in the linked set of documents is a member of the group consisting of documents whose respective hyperlink web addresses fall within the specified domain relative to the hyperlink base address.

46. The method of claim 45, wherein the second parameter is evaluated at least in part by accessing server-side metadata that supplies sitemap information to identify the documents in the linked set of documents.

47. The method of claim 41, further comprising:
passing via the application-layer interface a third parameter related to a current geographic location of the client-side computerized device,
wherein the multilevel search performed at the remote server uses the first, second and third parameters to cause each respective document in the linked set of documents to be analyzed to determine whether it respectively matches the content based search string, and additionally whether it meets a geographic location criterion, and only if it matches both the content based search string criterion and the geographic location criterion, then the remote server identifies it as a selected respective document.

48. The method of claim 41, wherein the client-side computerized device and the server side method utilize remote object technology, and the application layer interface comprises a remote object interface.

49. The method of claim 41, further comprising:
accepting from the user via the user interface a third parameter that designates a file type;

passing via the application-layer interface the third parameter to the remote server, wherein each document in the linked set of documents is a member of a group consisting of documents whose respective hyperlink web addresses fall within a specified domain relative to a hyperlink base address, and wherein the multilevel search is performed over all documents whose web addresses fall within the specified domain and the multilevel search further uses the third parameter to only identify a document as a selected respective document if the document is of the designated file type.

50. The method of claim 49, wherein the designated file type is a .pdf file type.

51. The method of claim 49, wherein the designated file type is a .ppt file type.

52. The method of claim 49, wherein the second parameter includes a user-entered text string that defines the domain.

53. The method of claim 41, further comprising:

accepting from the user via the user interface a third parameter that identifies a subsection type which is a member of the group consisting of a paragraph type, a heading type, and a designated tagged object type;

passing via the application-layer interface the third parameter to the remote server, wherein each document in the linked set of documents is a member of a group consisting of documents whose respective hyperlink web addresses fall within a specified domain relative to a hyperlink base address, and wherein the multilevel search is performed over all documents whose web addresses fall within the specified domain and the multilevel search further uses the third parameter to only identify a document as a selected respective document if the first parameter is matched by text found in the identified subsection type within the document.

54. The method of claim 53, wherein the second parameter includes a user-entered text string that defines the domain.

55. The method of claim 41, further comprising:

accepting from the user via the user interface a third parameter that designates a file type;

accepting from the user via the user interface a fourth parameter that identifies a subsection type which is a member of the group consisting of a paragraph type, a heading type, and a designated tagged object type; and passing via the application-layer interface the third and fourth parameters to the remote server, wherein each document in the linked set of documents is a member of a group consisting of documents whose respective hyperlink web addresses fall within a specified domain relative to a hyperlink base address, and wherein the multilevel search is performed over all documents whose web addresses fall within the specified domain, the multilevel search further uses the third parameter to only identify a document as a selected respective document if document is of the designated file type, and the multilevel search further uses the fourth parameter to only identity a document as a selected respective document if the first parameter is matched by text found in the identified subsection type within the document.

56. The method of claim 41, further comprising:

accepting from the client-side computerized device via the application-layer interface a third parameter that identifies an image file whose file type is a member of the group consisting of a .gif image file type and a .mpg moving image file type;

wherein each document in the linked set of documents is a member of a group consisting of documents whose respective hyperlink web addresses fall within a specified domain relative to a hyperlink base address; and wherein the multilevel search is performed over all documents whose web addresses fall within the specified domain and the multilevel search further uses the third parameter to only identify a document as a selected respective document if the first parameter is matched by text associated with in the image file.

57. The method of claim 56, wherein the file type is a .gif file type.

58. The method of claim 57, wherein the second parameter includes a user-entered text string that defines the domain, and server-side sitemap metadata is used to identify which documents are present in the domain.

59. The method of claim 56, wherein the file type is a .mpg file type.

* * * * *